United States Patent
Choi et al.

(10) Patent No.: US 8,135,082 B2
(45) Date of Patent: Mar. 13, 2012

(54) HIGH-ORDER MODULATION-BASED BURST MAPPING METHOD AND APPARATUS IN A MOBILE COMMUNICATION SYSTEM

(75) Inventors: Jongsoo Choi, Suwon-si (KR); Yan Xin, Suwon-si (KR); Ju-Ho Lee, Suwon-si (KR); Joon-Young Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1238 days.

(21) Appl. No.: 11/843,100

(22) Filed: Aug. 22, 2007

(65) Prior Publication Data

US 2008/0049859 A1  Feb. 28, 2008

(30) Foreign Application Priority Data

Aug. 22, 2006 (KR) .................. 10-2006-0079245

(51) Int. Cl.
*H04L 27/28* (2006.01)
*H04L 5/12* (2006.01)
(52) U.S. Cl. ........ 375/264; 375/280; 375/298; 375/316; 375/324; 714/752; 714/755
(58) Field of Classification Search .......... 375/259–264, 375/268–269, 279–280, 284–285, 295, 298, 375/316, 377; 714/699, 746, 752, 755; 370/464, 370/465, 470, 471
See application file for complete search history.

(56) References Cited

U.S. PATENT DOCUMENTS

| | | | |
|---|---|---|---|
| 6,259,744 B1* | 7/2001 | Lee et al. | 375/264 |
| 6,996,189 B1* | 2/2006 | Morejon et al. | 375/261 |
| 2002/0184596 A1* | 12/2002 | Dinc et al. | 714/794 |
| 2003/0031233 A1 | 2/2003 | Kim et al. | |
| 2003/0081690 A1* | 5/2003 | Kim et al. | 375/264 |
| 2004/0062318 A1* | 4/2004 | Yu et al. | 375/264 |

FOREIGN PATENT DOCUMENTS

| | | |
|---|---|---|
| KR | 1020010072174 | 7/2001 |
| KR | 1020040053055 | 6/2004 |
| WO | WO 01/91396 | 11/2001 |

* cited by examiner

*Primary Examiner* — David C. Payne
*Assistant Examiner* — James M Perez
(74) *Attorney, Agent, or Firm* — The Farrell Law Firm, P.C.

(57) ABSTRACT

A method for performing burst mapping on transmission data by a transmitter in a mobile communication system using a 16-ary Quadrature Amplitude Modulation (16-QAM) modulation scheme is disclosed. The burst mapping method includes generating control information bits and user data bits by encoding input control information and user data; dividing the control information bits and user data bits into more than two bursts; and arranging a Training Sequence Code (TSC) in a center of each burst, placing the coded control information bits in positions adjacent to the TSC, and swapping the user data bits with bits mapped to higher-reliability positions among the control information bits.

19 Claims, 30 Drawing Sheets

| D1 | | | D2 | | |
|---|---|---|---|---|---|
| TB 3 | ENCRYPTED DATA 58 | TSC 26 | ENCRYPTED DATA 58 | TB 3 | GP 8.25 |

TB : Tail Bits
TSC : Training Sequence Codes
GP : Guard Period
* NUMERALS INDICATE NUMBER OF SYMBOLS

FIG.5

Mapping Rule for MCS-7 Downlink:

For B=0,1,2,3, let $e(B,j)=s(231B+j-2[j/4])$ for j=0,...,190 and (j mod 4)=0,1
$e(B,j)=p(191B+j-2-(2[(j-2)/4]))$ for j=0,...,190 and (j mod 4)=2,3
$e(B,j)=s(231B+j-95)$ for j=191,...,210
$e(B,j)=h(31B+j-211)$ for j=211,...,225
$e(B,j)=u(9B+j-226)$ for j=226,...,231
$e(B,j)=q(2B+j-232)$ for j=232,233
$e(B,j)=u(9B+j-228)$ for j=234,...,236
$e(B,j)=h(31B+j-222)$ for j=237,...,252
$e(B,j)=s(231B+j-137)$ for j=253,...,271
$e(B,j)=s(231B+j-137-2[(j-271)/4])$ for j=272,···,463 and (j mod 4)=0,1
$e(B,j)=p(191B+j-177-2[(j-270)/4])$ for j=274,···,463 and (j mod 4)=2,3

FIG.10A

Mapping Rule for MCS-8 Downlink:

For B=0,1,2,3, let $e(B,j)=s(279B+j-2[j/4])$ for j=0,...,142 and (j mod 4)=0,1
$e(B,j)=p(143B+j-2-(2[(j-2)/4]))$ for j=0,...,142 and (j mod 4)=2,3
$e(B,j)=s(279B+j-71)$ for j=143,...,210
$e(B,j)=h(31B+j-211)$ for j=211,...,225
$e(B,j)=u(9B+j-226)$ for j=226,...,231
$e(B,j)=q(2B+j-232)$ for j=232,233
$e(B,j)=u(9B+j-228)$ for j=234,...,236
$e(B,j)=h(31B+j-222)$ for j=237,...,252
$e(B,j)=s(279B+j-113)$ for j=253,...,319
$e(B,j)=s(279B+j-113-2[(j-319)/4])$ for j=320,···,463 and (j mod 4)=0,1
$e(B,j)=p(143B+j-251-2[(j-320)/4])$ for j=322,···,463 and (j mod 4)=2,3

FIG.10B

Mapping Rule for MCS-9 Downlink:

For B=0,1,2,3, let

| | |
|---|---|
| $e(B,j)=s(303B+j-2\lfloor j/4 \rfloor)$ | for j=0,...,118 and (j mod 4)=0,1 |
| $e(B,j)=p(119B+j-2-(2\lfloor(j-2)/4\rfloor))$ | for j=0,...,118 and (j mod 4)=2,3 |
| $e(B,j)=s(279B+j-59)$ | for j=119,...,210 |
| $e(B,j)=h(31B+j-211)$ | for j=211,...,225 |
| $e(B,j)=u(9B+j-226)$ | for j=226,...,231 |
| $e(B,j)=q(2B+j-232)$ | for j=232,233 |
| $e(B,j)=u(9B+j-228)$ | for j=234,...,236 |
| $e(B,j)=h(31B+j-222)$ | for j=237,...,252 |
| $e(B,j)=s(303B+j-101)$ | for j=253,...,343 |
| $e(B,j)=s(303B+j-101-2\lfloor(j-343)/4\rfloor)$ | for j=344,⋯,463 and (j mod 4)=0,1 |
| $e(B,j)=p(119B+j-285-2\lfloor(j-342)/4\rfloor)$ | for j=344,⋯,463 and (j mod 4)=2,3 |

FIG.10C

```
For B=0,1,2,3,
    Swap e(B, 212) with e(B,188)
    Swap e(B, 214) with e(B,190)
    Swap e(B, 216) with e(B,192)
    Swap e(B, 218) with e(B,194)
    Swap e(B, 220) with e(B,196)
    Swap e(B, 222) with e(B, 198)
    Swap e(B, 224) with e(B, 200)
    Swap e(B, 226) with e(B, 202)
    Swap e(B, 228) with e(B, 204)
    Swap e(B, 230) with e(B, 206)
    Swap e(B, 235) with e(B, 255)
    Swap e(B, 237) with e(B, 257)
    Swap e(B, 239) with e(B, 259)
    Swap e(B, 241) with e(B, 261)
    Swap e(B, 243) with e(B, 263)
    Swap e(B, 245) with e(B, 265)
    Swap e(B, 247) with e(B, 267)
    Swap e(B, 249) with e(B, 269)
    Swap e(B, 251) with e(B, 271)
```

FIG.12A

```
For B=0,1,2,3,
    Swap e(B, 213) with e(B,189)
    Swap e(B, 216) with e(B,192)
    Swap e(B, 219) with e(B,195)
    Swap e(B, 222) with e(B,198)
    Swap e(B, 225) with e(B,199)
    Swap e(B, 228) with e(B, 201)
    Swap e(B, 231) with e(B, 204)
    Swap e(B, 236) with e(B, 256)
    Swap e(B, 239) with e(B, 259)
    Swap e(B, 242) with e(B, 262)
    Swap e(B, 245) with e(B, 265)
    Swap e(B, 248) with e(B, 268)
    Swap e(B, 251) with e(B, 271)
```

FIG.12B

```
For B=0,1,2,3,
    Swap e(B, 212) & e(B, 213) with e(B, 188) & e(B, 189)
    Swap e(B, 216) & e(B, 217) with e(B, 192) & e(B, 193)
    Swap e(B, 220) & e(B, 221) with e(B, 196) & e(B, 197)
    Swap e(B, 224) & e(B, 225) with e(B, 200) & e(B, 201)
    Swap e(B, 228) & e(B, 229) with e(B, 204) & e(B, 205)
    Swap e(B, 236) & e(B, 237) with e(B, 256) & e(B, 257)
    Swap e(B, 240) & e(B, 241) with e(B, 260) & e(B, 261)
    Swap e(B, 244) & e(B, 245) with e(B, 264) & e(B, 265)
    Swap e(B, 248) & e(B, 249) with e(B, 268) & e(B, 269)
```

FIG. 12C

Mapping Rule MCS-7 Downlink:

For B=0,1,2,3, let $e(B,j)=s(231B+j-2[j/4])$      for j=0,1,231 and (j mod 4)=0,1
$e(B,j)=p(191B+j-2-(2[(j-2)/4]))$      for j=0,···,191 and (j mod 4)=2,3
$e(B,j)=h(31B+j-194-2([(j-194)/4]))$      for j=192,···,222 and (j mod 4)=2,3
$e(B,j)=u(9B+j-223-2([(j-222)/4]))$      for j=223,···,231 and (j mod 4)=2,3
$e(B,j)=q(2B+j-232)$      for j=232,233
$e(B,j)=s(231B+j-236+116-2[(j-236)/4])$      for j=234,···,461 and (j mod 4)=0,1
$e(B,j)=u(9B+j-234+5-2[(j-234)/4])$      for j=234,···,239 and (j mod 4)=2,3
$e(B,j)=h(31B+j-242+15-2[(j-242)/4])$      for j=240,···,271 and (j mod 4)=2,3
$e(B,j)=p(191B+j-274+96-2[(j-274)/4])$      for j=272,···,462 and (j mod 4)=2,3
$e(B,j)=s(231B+j-233)$      for j=463

FIG.13A

Mapping Rule MCS-8 Downlink:

For B=0,1,2,3, let $e(B,j)=s(279B+j)$      for j=0,···,47
$e(B,j)=s(279B+j-2[(j-48)/4])$      for j=48,···,231 and (j mod 4)=0,1
$e(B,j)=p(143B+j-50-(2[(j-50)/4]))$      for j=48,···,191 and (j mod 4)=2,3
$e(B,j)=h(31B+j-194-2([(j-194)/4]))$      for j=192,···,222 and (j mod 4)=2,3
$e(B,j)=u(9B+j-223-2([(j-222)/4]))$      for j=223,···,231 and (j mod 4)=2,3
$e(B,j)=q(2B+j-232)$      for j=232,233
$e(B,j)=s(279B+j-236+140-2[(j-236)/4])$      for j=234,···,413 and (j mod 4)=0,1
$e(B,j)=u(9B+j-234+5-2[(j-234)/4])$      for j=234,···,239 and (j mod 4)=2,3
$e(B,j)=h(31B+j-242+15-2[(j-242)/4])$      for j=240,···,271 and (j mod 4)=2,3
$e(B,j)=p(143B+j-274+72-2[(j-274)/4])$      for j=272,···,414 and (j mod 4)=2,3
$e(B,j)=s(279B+j-415+230)$      for j=415,···,463

FIG.13B

Mapping Rule MCS-9 Downlink:

For B=0,1,2,3, let

```
e(B,j)=s(303B+j)                        for j=0,...,71
e(B,j)=s(303B+j-2[(j-72)/4])            for j=72,...,231 and (j mod 4)=0,1
e(B,j)=p(119B+j-74-(2[(j-74)/4]))       for j=72,...,191 and (j mod 4)=2,3
e(B,j)=h(31B+j-194-2([(j-194)/4]))      for j=192,...,222 and (j mod 4)=2,3
e(B,j)=u(9B+j-223-2([(j-222)/4]))       for j=223,...,231 and (j mod 4)=2,3
e(B,j)=q(2B+j-232)                      for j=232,233
e(B,j)=s(303B+j-236+152-2[(j-236)/4])   for j=234,...,413 and (j mod 4)=0,1
e(B,j)=u(9B+j-234+5-2[(j-234)/4])       for j=234,...,239 and (j mod 4)=2,3
e(B,j)=h(31B+j-242+15-2[(j-242)/4])     for j=240,...,271 and (j mod 4)=2,3
e(B,j)=p(119B+j-274+60-2[(j-274)/4])    for j=272,...,390 and (j mod 4)=2,3
e(B,j)=s(303B+j-391+230)                for j=391,...,463
```

Mapping Rule for MCS-7 Downlink:

For B=0,1,2,3, let $e(B,j) = s(231B+j-2\lfloor j/4 \rfloor)$     for $j=0,...,188$ and $(j \mod 4)=0,1$
$e(B,j) = p(191B+j-2-2\lfloor (j-2)/4 \rfloor)$     for $j=0,...,191$ and $(j \mod 4)=2,3$
$e(B,j) = h(31B+j-189-(2\lfloor (j-188)/4 \rfloor))$     for $j=189,...,217$ and $(j \mod 4)=0,1$
$e(B,j) = s(231B+j-194+95-(2\lfloor (j-192)/4 \rfloor))$     for $j=194,...,231$ and $(j \mod 4)=2,3$
$e(B,j) = u(9B+j-220-2(\lfloor (j-220)/4 \rfloor))$     for $j=220,...,228$ and $(j \mod 4)=0,1$
$e(B,j) = q(2B+j-229)$     for $j=229$
$e(B,j) = q(2B+j-232+1)$     for $j=232$
$e(B,j) = u(9B+j-233+5-2\lfloor (j-232)/4 \rfloor)$     for $j=233,...,240$ and $(j \mod 4)=0,1$
$e(B,j) = h(31B+j-241+15-2\lfloor (j-240)/4 \rfloor)$     for $j=241,...,272$ and $(j \mod 4)=0,1$
$e(B,j) = s(231B+j-234+115-2\lfloor (j-232)/4 \rfloor)$     for $j=234,...,271$ and $(j \mod 4)=2,3$
$e(B,j) = s(231B+j-273+135)$     for $j=273,274$
$e(B,j) = s(231B+j-276+137-2\lfloor (j-276)/4 \rfloor)$     for $j=276,...,461$ and $(j \mod 4)=0,1$
$e(B,j) = p(191B+j-275+96-2\lfloor (j-272)/4 \rfloor)$     for $j=275,...,463$ and $(j \mod 4)=2,3$

FIG.15A

Mapping Rule for MCS-8 Downlink:

For B=0,1,2,3, let $e(B,j) = s(279B+j-2\lfloor j/4 \rfloor)$     for $j=0,...,143$ and $(j \mod 4)=0,1$
$e(B,j) = p(143B+j-2-2\lfloor j/4 \rfloor)$     for $j=0,...,143$ and $(j \mod 4)=2,3$
$e(B,j) = s(279B+j-144+72)$     for $j=144,...,188$
$e(B,j) = h(31B+j-189-2\lfloor (j-188)/4 \rfloor)$     for $j=189,...,217$ and $(j \mod 4)=0,1$
$e(B,j) = s(279B+j-190+117-2\lfloor (j-188)/4 \rfloor)$     for $j=190,...,231$ and $(j \mod 4)=2,3$
$e(B,j) = u(9B+j-220-2(\lfloor (j-220)/4 \rfloor))$     for $j=220,...,228$ and $(j \mod 4)=0,1$
$e(B,j) = q(2B+j-229)$     for $j=229$
$e(B,j) = q(2B+j-232+1)$     for $j=232$
$e(B,j) = u(9B+j-233+5-2\lfloor (j-232)/4 \rfloor)$     for $j=233,...,240$ and $(j \mod 4)=0,1$
$e(B,j) = h(31B+j-241+15-2\lfloor (j-240)/4 \rfloor)$     for $j=241,...,272$ and $(j \mod 4)=0,1$
$e(B,j) = s(231B+j-234+139-2\lfloor (j-232)/4 \rfloor)$     for $j=234,...,271$ and $(j \mod 4)=2,3$
$e(B,j) = s(231B+j-273+159)$     for $j=273,...,322$
$e(B,j) = s(231B+j-324+209-2\lfloor (j-324)/4 \rfloor)$     for $j=324,...,461$ and $(j \mod 4)=0,1$
$e(B,j) = p(191B+j-323+72-2\lfloor (j-320)/4 \rfloor)$     for $j=323,...,463$ and $(j \mod 4)=2,3$

FIG.15B

Mapping Rule for MCS-9 Downlink:

For B=0,1,2,3, let

| | |
|---|---|
| $e(B,j)=s(279B+j-2\lfloor j/4 \rfloor)$ | for $j=0,\ldots,119$ and $(j \bmod 4)=0,1$ |
| $e(B,j)=p(143B+j-2-2\lfloor j/4 \rfloor)$ | for $j=0,\ldots,119$ and $(j \bmod 4)=2,3$ |
| $e(B,j)=s(279B+j-120+60)$ | for $j=120,\ldots,188$ |
| $e(B,j)=h(31B+j-189-2\lfloor(j-188)/4\rfloor)$ | for $j=189,\ldots,217$ and $(j \bmod 4)=0,1$ |
| $e(B,j)=s(279B+j-190+129-2\lfloor(j-188)/4\rfloor)$ | for $j=190,\ldots,231$ and $(j \bmod 4)=2,3$ |
| $e(B,j)=u(9B+j-220-2\lfloor(j-220)/4\rfloor)$ | for $j=220,\ldots,228$ and $(j \bmod 4)=0,1$ |
| $e(B,j)=q(2B+j-229)$ | for $j=229$ |
| $e(B,j)=q(2B+j-232+1)$ | for $j=232$ |
| $e(B,j)=u(9B+j-233+5-2\lfloor(j-232)/4\rfloor)$ | for $j=233,\ldots,240$ and $(j \bmod 4)=0,1$ |
| $e(B,j)=h(31B+j-241+15-2\lfloor(j-240)/4\rfloor)$ | for $j=241,\ldots,272$ and $(j \bmod 4)=0,1$ |
| $e(B,j)=s(231B+j-234+151-2\lfloor(j-232)/4\rfloor)$ | for $j=234,\ldots,271$ and $(j \bmod 4)=2,3$ |
| $e(B,j)=s(231B+j-273+171)$ | for $j=273,\ldots,346$ |
| $e(B,j)=s(231B+j-348+245-2\lfloor(j-348)/4\rfloor)$ | for $j=348,\ldots,461$ and $(j \bmod 4)=0,1$ |
| $e(B,j)=p(191B+j-347+60-2\lfloor(j-344)/4\rfloor)$ | for $j=347,\ldots,463$ and $(j \bmod 4)=2,3$ |

FIG.15C

HIGH-ORDER MODULATION-BASED BURST MAPPING METHOD AND APPARATUS IN A MOBILE COMMUNICATION SYSTEM

PRIORITY

This application claims priority under 35 U.S.C. §119(a) to a Korean Patent Application filed in the Korean Intellectual Property Office on Aug. 22, 2006 and assigned Serial No. 2006-79245, which is incorporated herein by reference.

BACKGROUND OF THE INVENTION

1. Field of the Invention

The present invention relates generally to a burst mapping method and apparatus in a mobile communication system, and, in particular, to a method and apparatus for efficiently performing burst mapping using 16-ary Quadrature Amplitude Modulation (16-QAM) and symbol mapping in a Global System for Mobile communication (GSM)/Enhanced Data rates for GSM Evolution (EDGE) system.

2. Description of the Related Art

In the GSM/EDGE system, which is a European communication system, different coding schemes can be used according to the modulation scheme and the coding scheme.

The modulation scheme used in the GSM/EDGE system can include Gaussian Minimum Shift Keying (GMSK) and 8-ary Phase Shift Keying (PSK) modulation schemes. The GMSK scheme, which is a scheme for limiting a bandwidth by passing binary data through a Gaussian low-pass filter and then performing frequency modulation with a predetermined deviation ratio, allows an interval between two frequencies to continuously change, thereby providing high spectrum concentration and high out-band spectrum suppression. The 8-PSK scheme, which is a scheme for mapping data to a phase-shifted code of a sub-carrier for modulation, can increase frequency efficiency.

Thirteen techniques for Packet Data Traffic Channels (PDTCH) are defined as a coding scheme used in the GSM/EDGE system. The thirteen techniques include four schemes of Coding Schemes (CSs), CS-1/2/3/4 for General Packet Radio Service (GPRS), and nine schemes of Modulation and Coding Schemes (MCSs), MCS-1 to MCS-9 for Enhanced General Packet Radio Service (EGPRS).

During actual communication, one of various combinations of the modulation schemes and the coding techniques is selected and used. The combinations can be identified as MCSs.

EDGE is an extension scheme for a GSM data service, and the EDGE system generally supports Enhanced Circuit-Switched Data (ECSD) and EGPRS. EGPRS uses nine schemes of MCS-1 to MCS-9, each combined of a modulation scheme and a coding scheme. MCS-1 to MCS-4 each use the GMSK modulation scheme, and MCS-5 to MCS-9 each use the 8-PSK modulation scheme. One of the nine MCSs can be determined according to input data.

With reference to the accompanying drawings, a detailed description will be made of a structure of a transceiver for processing input data, for individual MCS types.

FIG. 1 illustrates a structure of a downlink transmitter using MCS-5 to MCS-9 in an EDGE system. Referring to FIG. 1, a Radio Link Control (RLC) packet data block (RLC block) 110 separately outputs Uplink State Flag (USF), header and user data to an encoder 120 according to input user data. Generally, one RLC packet is composed of USF, header and source data.

The encoder 120 can include a USF precoding block 121 for USF coding; a cyclic code adder 123 and a convolutional encoder 125 for header coding; and a cyclic code adder 127 and a convolutional encoder 129 for data coding. The USF, header and data received from the RLC block 110 are input to the USF precoding block 121, cyclic code adder 123 and cyclic code adder 127, respectively, and then coded therein. That is, the USF undergoes precoding in the USF precoding block 121, and the header undergoes convolutional coding in the convolutional encoder 125 after a Cyclic Redundancy Check (CRC) code is added thereto in the cyclic code adder 123. In this manner, the header undergoes coding. Similar to the header, the data undergoes coding through the cyclic code adder 127 and the convolutional encoder 129.

An interleaver 130 for the header interleaves the coded header output from the convolutional encoder 125.

An interleaver 140 for the data interleaves the coded data output from the convolutional encoder 129.

A burst mapper 150 performs burst mapping on the coded bits of the USF, header and data output, respectively, from the USF precoding block 121 and the interleavers 130 and 140, to allocate the coded bits to four bursts in a distributed manner. The burst mapper 150 outputs the bits allocated to four bursts, to an 8-PSK modulator 160.

The 8-PSK modulator 160 performs 8-PSK modulation on the bursts received from the burst mapper 150 before transmission.

A detailed description of a device additionally needed for transmitting the modulated signal, for example, a Digital-to-Analog (D/A) converter is known to those of skill in the art and therefore is omitted herein.

FIG. 2 illustrates a structure of a downlink receiver using MCS-5 to MCS-9 in an EDGE system. Referring to FIG. 2, an equalizer/demodulator 210 performs signal-to-noise equalization on the signal received from the transmitter of FIG. 1, performs demodulation thereon, and then outputs the resulting signal to a burst demapper 220.

The burst demapper 220 demaps the input signal into the bits before they were mapped/allocated to four bursts in the transmitter, i.e. into signaling data such as user data (data source), USF, header, etc. The signaling data means control information.

A deinterleaver 230 performs deinterleaving on the bits output from the burst demapper 220.

A channel decoder 240 performs channel decoding on the bits output from the deinterleaver 230. In this manner, the original data is restored.

Although the receiver can further include a Radio Frequency (RF) unit for receiving an analog signal over the air, and an Analog-to-Digital (A/D) converter for converting the analog signal into a digital signal, the function and structure of the RF unit and A/D converter is known to those of skill in the art and therefore a description thereof will be omitted herein.

However, the existing MCS-5 to MCS-9 using the 8-PSK modulation scheme, although they can increase frequency efficiency due to a characteristic of the 8-PSK scheme, are apt to suffer from noise because of a decrease in the distance between phase states.

The 3rd Generation Partnership Project (3GPP) in charge of standardization for the GSM/EDGE system, especially the GSM/EDGE Radio Access Network (GERAN) system, is conducting a discussion on GERAN Evolution. In the ongoing discussion, several methods for system performance improvement are proposed, and one of the proposed methods is to introduce the turbo code and 16-QAM modulation scheme used in Universal Mobile Telecommunication Service (UMTS) to the existing GERAN system. The currently considered turbo code, having a mother coding rate of ⅓, is the same turbo code as that in the existing UMTS system. With use of the turbo code, one information bit frame can be divided into information bits and parity bits through coding. In other words, when one information bit frame is input to a turbo encoder, the turbo encoder separates the one information bit frame into information bits (or systematic bits) and parity bits. That is, the coded output is separated into an information bit stream and a parity bit stream after undergoing a puncturing and rate matching algorithm according to a channel coding rate.

Recently, there has been developed a technology for mapping information bits and parity bits according to priority by disposing two interleavers at an output stage of the turbo encoder and using characteristics of the turbo encoder. This technology is called Symbol Mapping based on Priority (SMP). SMP interleaves information bits and parity bits independently, and then maps the interleaved information bits and parity bits to higher-reliability bit positions and lower-reliability bit positions according to priority of the bits, before transmission. In other words, important data is allocated to the higher-reliability bit positions in a modulation symbol, and less important data is allocated to the lower-reliability bit positions in the modulation symbol before being transmitted, thereby increasing reliability of the system.

With reference to the accompanying figures, a detailed description will now be made of a 16-QAM scheme, another proposed scheme of the GERAN Evolution system.

FIG. 3 illustrates a Gray-encoded signal constellation available in a 16-QAM modulation scheme of a UMTS system. Referring to FIG. 3, four signal points are located in each area in a quadrant composed of an In-Phase (I) axis and a Quadrature-Phase (Q) axis. That is, $S_1$, $S_2$, $S_3$, $S_4$ are located in an area one (A1) 310; $S_5$, $S_6$, $S_7$, $S_8$ are located in an area two (A2) 320; $S_9$, $S_{10}$, $S_{11}$, $S_{12}$ are located in an area three (A3) 330; and $S_{13}$, $S_{14}$, $S_{15}$, $S_{16}$ are located in an area four (A4) 340. The signal points each correspond to modulation symbols each composed of 4 bits, and Gray coding is performed for allocation as shown in FIG. 3 so that signal points, first and third bits of which are the same bits, exist in the same area. Therefore, in the illustrated constellation, first and second bit positions in each modulation symbol are higher-reliability bit positions (H), whereas third and fourth bit positions are lower-reliability bit positions (L).

Therefore, there is a need for a method of efficiently mapping data to each burst in the EDGE transmission system so as to enable a scheme of mapping important data and less important data to the higher-reliability bit positions and the lower-reliability bit positions, respectively.

SUMMARY OF THE INVENTION

An aspect of the present invention is to address at least the above problems and/or disadvantages and to provide at least the advantages described below. Accordingly, an aspect of the present invention is to provide a data transmission/reception method and apparatus for improving performance of a GSM/EDGE Evolution communication system.

Another aspect of the present invention is to provide burst mapping method and apparatus for efficiently transmitting/receiving data in a GSM/EDGE Evolution communication system.

Another aspect of the present invention is to provide a method and apparatus for allocating/transmitting data having reliability corresponding to reliability of 16-QAM symbol bits during burst mapping, thereby maximizing a turbo coding gain.

According to one aspect of the present invention, there is provided a method for performing burst mapping on transmission data by a transmitter in a mobile communication system using a 16-ary Quadrature Amplitude Modulation (16-QAM) modulation scheme. The burst mapping method includes generating control information bits and user data bits by encoding input control information and user data; dividing the control information bits and user data bits into more than two bursts; and arranging a Training Sequence Code (TSC) in a center of each burst, placing the coded control information bits in positions adjacent to the TSC, and swapping the user data bits with bits mapped to higher-reliability positions among the control information bits.

According to another aspect of the present invention, there is provided an apparatus for performing burst mapping on transmission data in a mobile communication system using the 16-QAM modulation scheme. The burst mapping apparatus includes an encoder for generating control information bits and user data bits by encoding input control information and user data; a burst mapper for dividing the control information bits and user data bits into more than two bursts; and a symbol mapper for arranging a Training Sequence Code (TSC) in a center of each burst, placing the coded control information bits in positions adjacent to the TSC, and swapping the user data bits with bits mapped to higher-reliability positions among the control information bits.

According to further another aspect of the present invention, there is provided a method for receiving data in a mobile communication system using the 16-QAM modulation scheme. The data reception method includes performing channel estimation on a received signal; swapping control information with bits mapped to higher-reliability positions among user data bits of more than two bursts obtained by demodulating the channel-estimated signal according to a 16-QAM signal constellation, thereby rearranging symbols of each burst; and classifying the rearranged bits in each burst into bits before they are mapped and allocated to the bursts.

According to yet another aspect of the present invention, there is provided an apparatus for receiving data in a mobile communication system using a the 16-QAM modulation scheme. The data reception apparatus includes a demodulator for performing channel estimation on a received signal; a symbol demapper for swapping control information with bits mapped to higher-reliability positions among user data bits of more than two bursts obtained by demodulating the channel-estimated signal according to a 16-QAM signal constellation, thereby rearranging symbols of each burst; and a burst demapper for classifying the rearranged bits in each burst into bits before they are mapped and allocated to the bursts.

BRIEF DESCRIPTION OF THE DRAWINGS

The above and other aspects, features and advantages of the present invention will become more apparent from the following detailed description when taken in conjunction with the accompanying drawings in which:

FIG. 5 illustrates a structure of a normal burst according to a preferred embodiment of the present invention;

FIGS. 10A, 10B and 10C illustrate burst mapping rules for MCS-7/8/9 downlinks, to which a first embodiment of the present invention is applied;

FIGS. 12A, 12B and 12C illustrate swapping rules for swapping every second bit of signaling data according to the first embodiment of the present invention;

FIGS. 13A, 13B and 13C illustrate burst mapping rules for MCS-7/8/9 downlinks to which a second embodiment of the present invention is applied;

FIGS. 14A, 14B and 14C illustrate structures of data arranged in a burst #0 using the mapping rules for MCS-7/8/9 of FIGS. 13A, 13B and 13C;

FIGS. 15A, 15B and 15C illustrate burst mapping rules for MCS-7/8/9 downlinks to which a third embodiment of the present invention is applied;

DETAILED DESCRIPTION OF THE PREFERRED EMBODIMENTS

Preferred embodiments of the present invention will now be described in detail with reference to the annexed drawings. In the following description, a detailed description of known functions and configurations incorporated herein has been omitted for clarity and conciseness.

Figure 4:
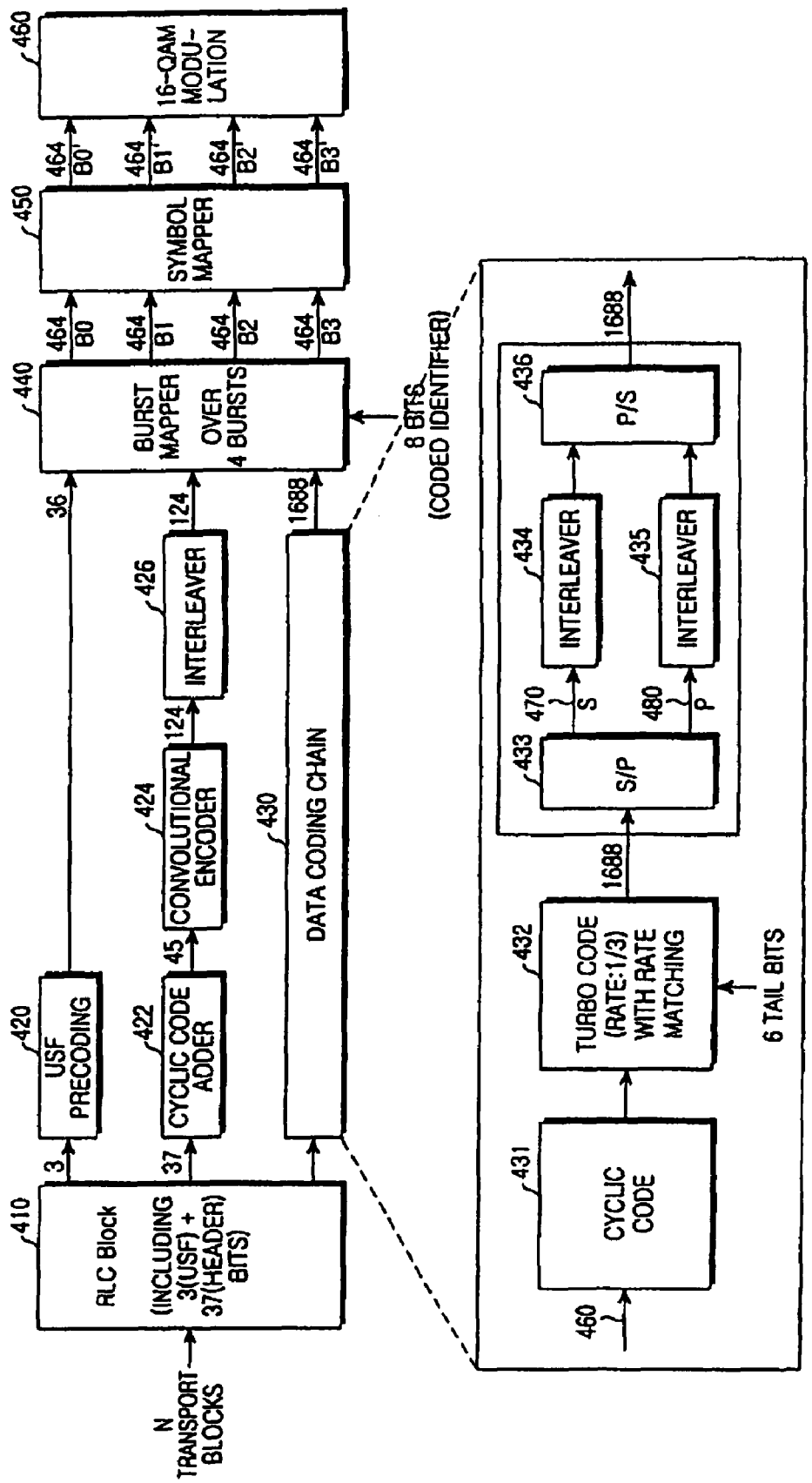
FIG. 4 illustrates a structure of a transmitter for transmitting a packet according to a preferred embodiment of the present invention.

FIG. 4 illustrates a structure of a transmitter for transmitting a packet according to a preferred embodiment of the present invention. A detailed description of a structure and operation according to the present invention will be made herein with reference to a transmitter that transmits downlink packets using MCSs including 16-QAM, for example, MCS-7, MCS-8 and MCS-9 schemes used in the GERAN Evolution system. However, those skilled in the art that the packet transmission/reception will recognize from the following description that the present invention can be achieved in other mobile communication systems having the similar technical background and channel format with a slight modification.

Figure 1:
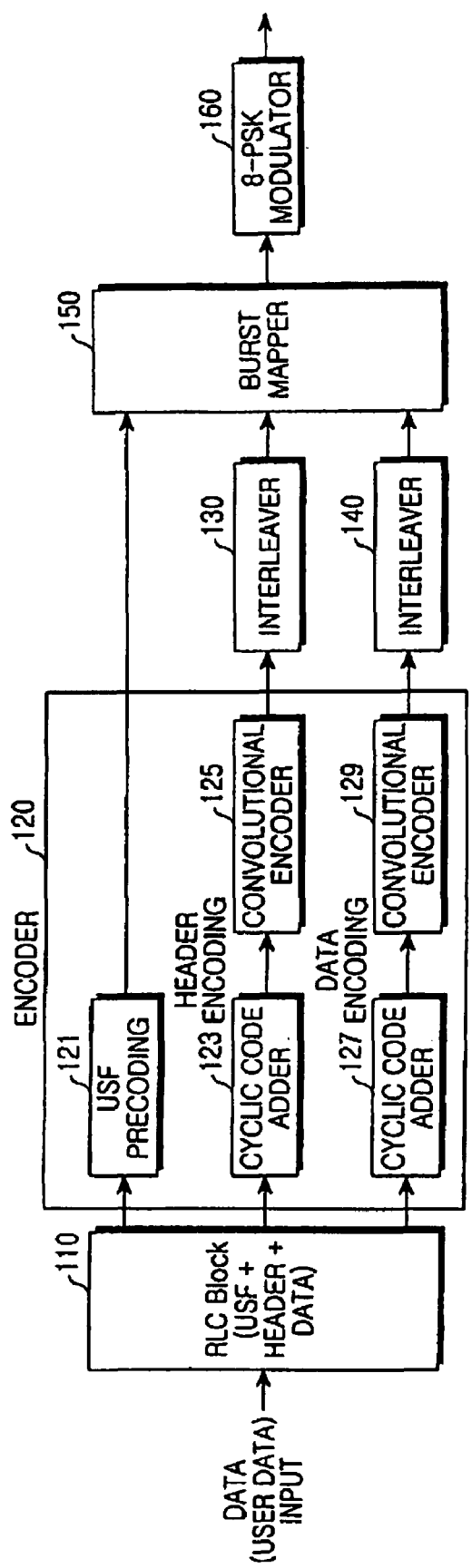
FIG. 1 illustrates a structure of a downlink transmitter using MCS-5 to MCS-9 in an EDGE system.
Figure 2:
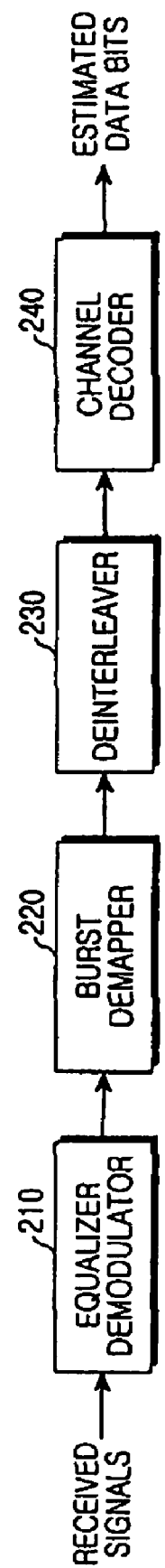
FIG. 2 illustrates a structure of a downlink receiver using MCS-5 to MCS-9 in an EDGE system.

Referring to FIG. 4, an RLC packet data block (RLC block) 410, like the RLC block 110 of FIG. 1, separates USF, header and user data from input user data (or N transport blocks), and outputs them to a USF precoding block 420, a cyclic code adder 422, and a data coding chain (or data encoder) 430, respectively. One RLC data packet herein is composed user data, 3-bit USF and 37-bit header. The USF and the header are control information.

The 3-bit USF input to the USF precoding block 420 becomes a 36-bit coded USF through preceding, and is output to a burst mapper 440.

The 37-bit header input to the cyclic code adder 422 becomes a 45-bit header after a CRC, or a cyclic code, is added thereto, and then is input to a convolutional encoder 424. The convolutional encoder 424 performs convolutional coding on the input 45-bit header, and then outputs a 124-bit coded header to an interleaver 426. The interleaver 426 performs interleaving on the coded header from the convolutional encoder 424, and outputs the resulting header to the burst mapper 440. The USF precoding block 420, cyclic code adder 422, convolutional encoder 424 and interleaver 426 correspond to a control information encoder.

The user data differs in number of bits according to MCS applied thereto. For MCS-7, the number of bits of the user data is 900 bits, and the 900-bit data is input to a turbo encoder 432 after a CRC code is added thereto in a cyclic code adder 431 by an error detection algorithm. The turbo encoder 432 performs a code puncturing and rate matching process on the CRC-added bits using a turbo code, and outputs 1688-bit coded data.

A serial-to-parallel (S/P) converter 433 performs a serial-to-parallel conversion process on the input 1688-bit coded data to separate the data into systematic bits (S) 470 and parity bits (P) 480, and outputs them to interleavers 434 and 435, respectively.

The interleaver 434 performs interleaving on the input information bits, and the interleaver 435 performs interleaving on the input parity bits, to generate their bit streams, i.e. an S stream and a P stream, and then output the bit streams to a parallel-to-serial (P/S) converter 436.

The parallel-to-serial converter 436 performs a parallel-to-serial conversion process on the input bit streams, and then outputs a single 1688-bit stream to the burst mapper 440.

The number of bits for each processed in the data coding chain 430 described in regard to FIG. 4 is the number of bits for MCS-7. For MCS-8 or MCS-9, the number of bits to be output from the reference numerals (entities) 460, 470 and 480 are subject to change. As shown in Table 1, the number of bits output from the data coding chain 430 is different according to MCS type.

TABLE 1

|  | Reference numeral 460 | Reference numeral 470 | Reference numeral 480 |
|---|---|---|---|
| MCS-7 | 900 bits | 924 bits | 764 bits |
| MCS-8 | 1092 bits | 1116 bits | 572 bits |
| MCS-9 | 1188 bits | 1212 bits | 476 bits |

Although the foregoing description has been made for the case where a data source, or one bit stream, is input to one cyclic code adder 431 and one turbo encoder 432 in the data coding chain 430, the data source can be divided into two same bit streams and then input to the data coding chain 430 in which a CRC is added to each of the bit streams and then input to two turbo encoders.

The burst mapper 440 performs burst mapping on the 36-bit USF, the 124-bit header, and the 1688-bit coded bits output, respectively, from the USF preceding block 420, the interleaver 426 and the parallel-to-serial converter 436, to allocate them to 4 bursts. The burst mapper 440 outputs the 4 bursts, to each of which 464 bit bits are allocated, to a symbol mapper 450.

The symbol mapper 450 rearranges the bits allocated to each of the bursts according to an arrangement pattern based on reliability of a modulation symbol in the corresponding 16-QAM scheme to be used. That is, for the user data, the systematic bits are preferentially arranged in higher-reliability positions, and the parity bits are preferentially arranged in lower-reliability positions. USF u and header h, constituting control information, are arranged in the higher-reliability positions and the lower-reliability positions in a distributed manner. In arranging the control information, the symbol mapper 450 allocates bits of the control information to the place which is as close as possible to a Training Sequence Code (TSC) arranged in the center of each burst. Herein, the control information means signaling data, and the control information and the signaling data are used in the same meaning. After performing the symbol mapping on the bursts, the symbol mapper 450 outputs the symbol-mapped bursts to a 16-QAM modulator 460. The symbol mapping method is described below in detail for individual embodiments. Although the symbol mapper 450 is separately shown herein for convenience, it can be included in the burst mapper 440.

The 16-QAM modulator 460 performs 16-QAM modulation based on a predetermined signal constellation on the 4-bit modulation symbols of the bursts input from the burst mapper 440. Although already mentioned, a further detailed description of the present invention is provided for the parts necessary for those of skill in the art to implement the present invention. That is, a description of a device additionally necessary for transferring the modulated signal, for example, a D/A converter, will be omitted herein since it is understood by those of skill in the art.

FIG. 5 illustrates a structure of a normal burst according to a preferred embodiment of the present invention. The normal burst, which is the most general burst structure used in the GSM/EDGE system, is transmitted within one time slot from a base station or a mobile station.

Referring to FIG. 5, the normal burst is roughly composed of a data part including user data and signaling data, and a TSC part. A TSC used for channel estimation is arranged in the TSC part, and the TSC is composed of 26 symbols.

The data part includes coded user data and coded signaling data, and is divided into two 58-symbol parts D1 and D2, which are arranged to the left and right of the TSC, respectively, as shown in FIG. 5.

The burst includes 3-symbol Tail Bit (TB) parts arranged to the left and right of the data parts D1 and D2, respectively, and an 8.25-symbol Guard Period (GP) located at the end of the burst, in addition to the data part and the TSC part.

Figure 6:
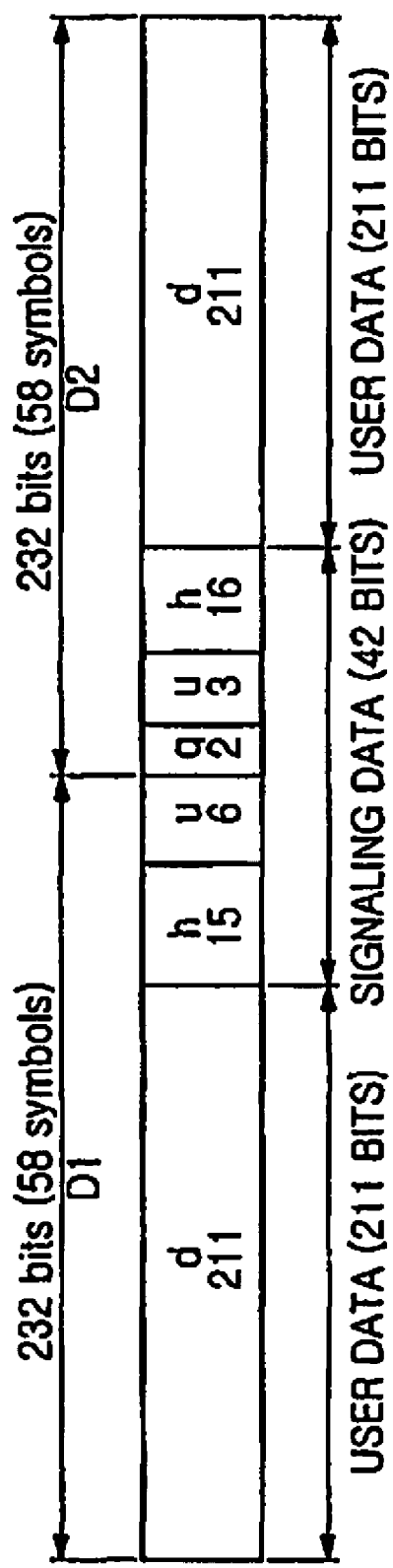
FIG. 6 illustrates a structure of data arranged in 1 burst according to a preferred embodiment of the present invention.

The user data and signaling data of a total of 1856 bits input to the burst mapper 440 in FIG. 4 (i.e. the total number of bits for 1688-bit coded data d, 124-bit header h, 36-bit USF u and 8-bit code identifier q) are allocated to 4 bursts on a distributed basis, so that 464 bits are allocated to 1 burst. This means that 1 burst transmits 116 16-QAM symbols. Therefore, 464 bits allocated to 1 burst include 422-bit data d, 31-bit header h, 9-bit USF u and 2-bit code identifier q, and are modulated with 116 16-QAM symbols before being transmitted. With reference to FIG. 6, a detailed description is provided of a structure of a 464-bit data part arranged in the 1 burst.

FIG. 6 illustrates a structure of data arranged in 1 burst according to a preferred embodiment of the present invention. Referring to FIG. 6, because 1 symbol is composed of 4 bits, 58-symbol data parts D1 and D2 each are composed of 232 bits in the 1 burst.

D1 is composed of 211-bit user data d, 15-bit header h and 6-bit USF u, and D2 is composed of 211-bit user data d, 16-bit header h, 3-bit USF u and 2-bit code identifier q. Herein, because the 31-bit header h, 9-bit USF u and 2-bit code identifier q corresponding to the signaling data generally include important control information, they are preferentially allocated to the positions close to the TSC as shown in FIG. 5, and the user data is arranged in the remaining part. In particular, the 2-bit code identifier q is located in the place in contact with the TSC having good channel condition and high reliability.

Figure 7:
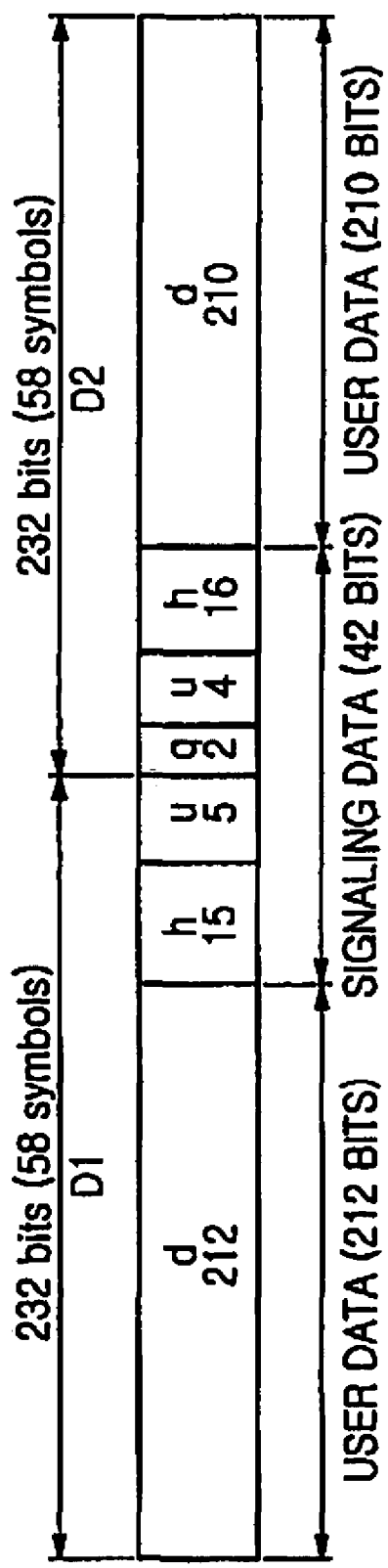
FIG. 7 illustrating a structure of data arranged in 1 burst according to another embodiment of the present invention.

FIG. 7 illustrates a structure of data arranged in 1 burst according to another embodiment of the present invention. Referring to FIG. 7, an alternative data arrangement, although similar to the data arrangement shown in FIG. 6, provides that D1 includes 212-bit user data d, 15-bit header h and 5-bit USF u, and D2 includes 210-bit user data d, 16-bit header h, 4-bit USF u and 2-bit code identifier q. In addition to the arrangement patterns shown in FIGS. 6 and 7, there are various other possible arrangement patterns.

Figure 8:
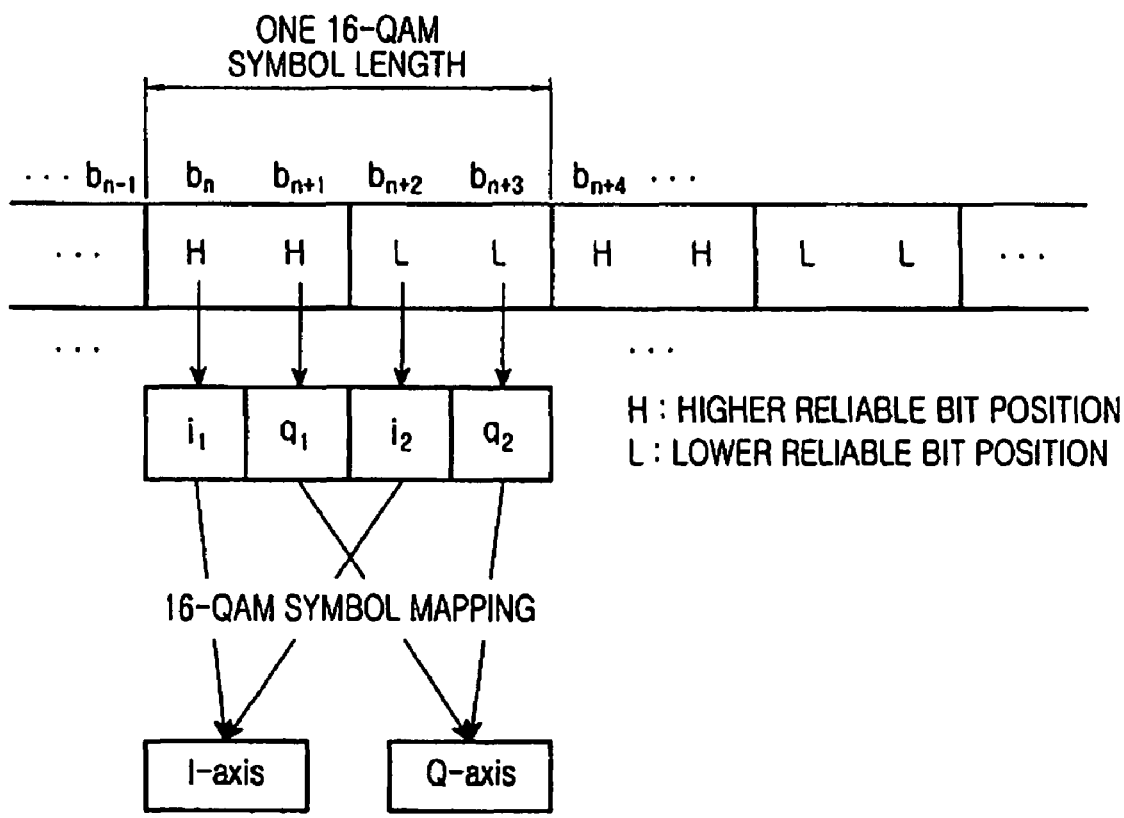
FIG. 8 illustrates a 16-QAM symbol mapping rule to which SMP technology is applied, according to a preferred embodiment of the present invention.

FIG. 8 illustrates a 16-QAM symbol mapping rule to which SMP technology is applied, according to a preferred embodiment of the present invention. Referring to FIG. 8, if bit positions of data d, u, h and q allocated to each burst are denoted by n=0, 1, ..., one 16-QAM symbol is composed of 4 consecutive data bits ($b_n$, $b_{n+1}$, $b_{n+2}$, $b_{n+3}$), in which (n mod 4)=0 is applied.

The above-described SMP technology allocates important data to higher-reliability bits and less important data to lower-reliability bits. In addition, in the 16-QAM signal constellation shown in FIG. 3, because the signal points in the same area are equal in their first and second bits, the first and second bits have higher reliability, and the third and fourth bits have lower reliability.

Therefore, the first two bits ($b_n$, $b_{n+1}$) of the symbol are arranged in higher-reliability positions H, and the remaining two bits ($b_{n+2}$, $b_{n+3}$) are arranged in lower-reliability positions L. In the 16-QAM signal constellation of FIG. 3, the first and third bits are indicated by ($i_1=b_n$, $i_2=b_{n+2}$) because they decide an I-component, and the second and fourth bits are indicated by ($q_1=b_{n+1}$, $q_2=b_{n+3}$) because they decide a Q-component. Therefore, the two bits allocated to the higher-reliability positions are allocated to $i_1$ and $q_1$, respectively.

Figure 9:
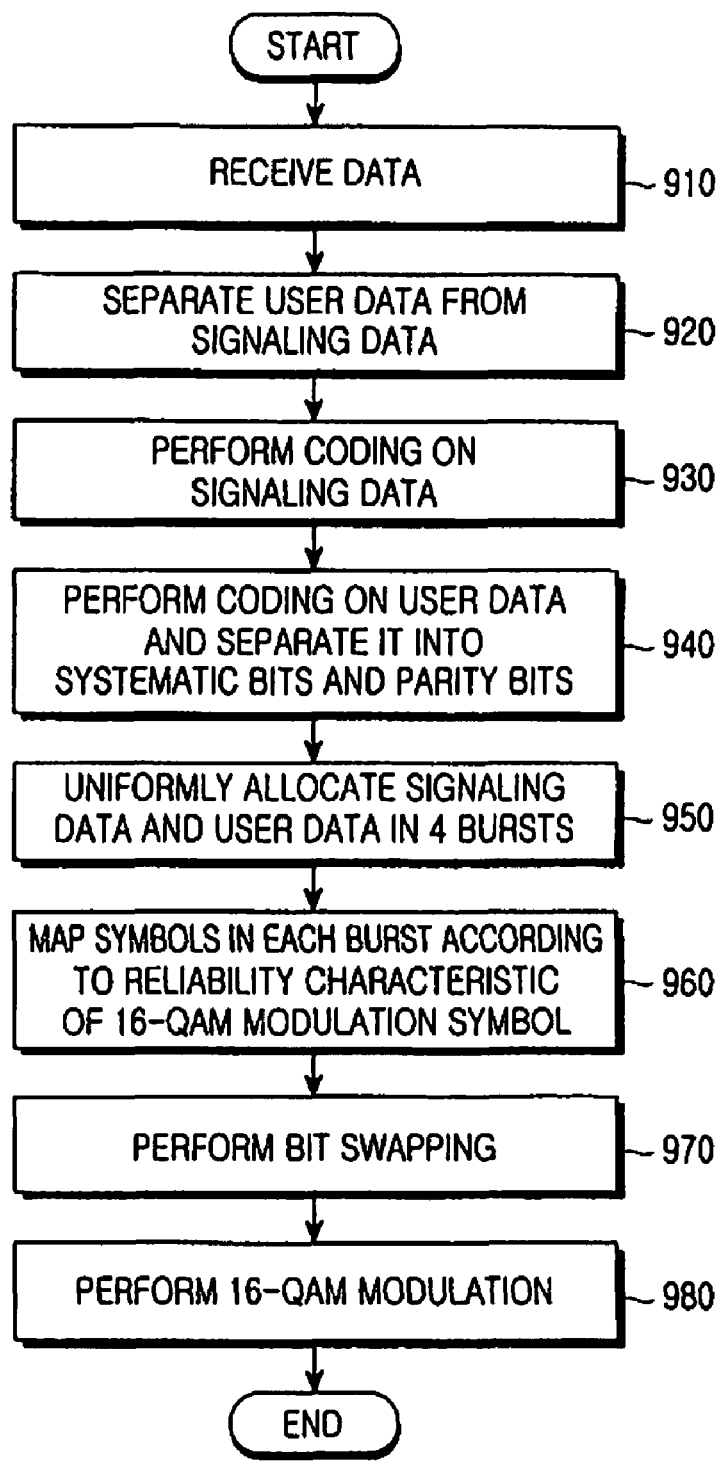
FIG. 9 is a flowchart illustrating a symbol mapping process for a burst in a transmitter according to a preferred embodiment of the present invention.

FIG. 9 is a flowchart illustrating a symbol mapping process for a burst in a transmitter according to a preferred embodiment of the present invention. Referring to FIG. 9, in step 910, an RLC block 410 of FIG. 4 receives data.

In step 920, the RLC block 410 separates the input data into signaling data and user data. The signaling data includes 3-bit USF and 37-bit header.

In step 930, a coding process is performed on the signaling data. That is, in the signaling data, the 3-bit USF undergoes precoding in USF precoding block 420, and the 37-bit header becomes 45 bits after a CRC code is added thereto in cyclic code adder 422, and then becomes 124 bits after undergoing a convolutional coding process in convolutional encoder 424. Thereafter, the 124 bits are interleaved in interleaver 426. The precoding process on the USF and the precoding process on the header are performed in parallel.

In step 940, a coding process is performed on the user data. Specifically, as for the user data input to a data coding chain 430, for MCS-7, 900-bit data is input to cyclic code adder 431, and the cyclic code adder 431 adds a CRC code to the 900-bit data and outputs the resulting data to turbo encoder 432. The turbo encoder 432 performs code puncturing and rate matching on the input data, and outputs 1688-bit coded data to serial-to-parallel converter 433. The serial-to-parallel converter 433 divides the single data into 924 systematic bits and 764 parity bits, and transfers them to interleavers 434 and 435, respectively. The interleavers 434 and 435 perform interleaving on their input systematic bits and parity bits, respectively, and then transfer their output bits to parallel-to-serial converter 436. The parallel-to-serial converter 436 converts the divided systematic bits and parity bits into 1688-bit single data. In this manner, the coding on the user data is performed in step 940. Steps 930 and 940 are performed in parallel.

In step 950, burst mapper 440 uniformly arranges the 36-bit USF, 124-bit header and 1688-bit user data in 4 bursts such that each burst is composed of 464 bits.

In step 960, a symbol mapper 450 performs symbol mapping on the bits arranged in the bursts in step 950 according to reliability characteristic of modulation symbols based on the 16-QAM signal constellation, using one of the first to third embodiments described herein. In each modulation symbol, an arrangement pattern of higher-reliability bit positions H and lower-reliability bit positions L are preferably HHLL or HLHL according to the 16-QAM modulation scheme used. In this case, in the user data, systematic bits are preferentially allocated to the higher-reliability bit positions, and the parity bits are preferentially allocated to the lower-reliability bit positions. The control information bits are also allocated to the higher-reliability bit positions and the lower-reliability bit positions in a distributed manner, thereby providing the burst arrangement shown in FIG. 6 or 7.

In step 970, the symbol mapper 450 selects control information bits to be swapped for the data mapped in step 960, and swaps the user data bits corresponding thereto. Depending on reliability of the control information bits to be swapped, the symbol mapper 450 swaps them with the user data bits having the reliability corresponding thereto. The bit swapping is performed to protect the signaling data.

In step 980, 16-QAM modulator 460 performs 16-QAM modulation on four bits of the data bit-swapped in step 970.

A description is now provided of embodiments proposed in the present invention. Based on the data arrangement pattern shown in FIG. 6, during burst mapping for MCS-7, MCS-8 and MCS-9, 16-QAM symbol mapping is performed according to the following embodiments. In this manner, performance of the wireless communication system can be improved.

First Embodiment

Burst mapping performed using the SMP symbol mapping technology follows the following rule.

1. User data (S, P), USF (hereinafter referred to as 'u'), header (hereinafter referred to as 'h') and code identification bits q are uniformly divided into four parts, and then allocated to four bursts, respectively. Herein, the user data S means systematic bits (hereinafter referred to as 's') and the user data P means parity bits (hereinafter referred to as 'p').

2. During symbol mapping, S is arranged in higher-reliability bit positions H of each modulation symbol, and P is arranged in lower-reliability bit positions L. Because the number of S bits is not equal to the number of P bits (S>P), burst mapping is formed such that as many bits as possible can follow a 'HHLL' symbol mapping rule.

3. In the burst mapping formed in Step 2, u and h are uniformly arranged in the H and L positions in a manner similar to that shown in FIGS. 6 and 7.

4. As shown in FIG. 6 or 7, because q bits used for code identification are non-coded data, they are allocated to the H positions closest to TSC.

5. As for the u and h bits selected for protection of signaling data including control information, they undergo bit swapping with an adjacent user data part, to prevent the signaling data included in one symbol from being completely lost due to a loss of the symbol.

For example, in the bit swapping, u and h bits arranged in H are swapped with the data arranged in H positions among the user data bits, and u and h bits arranged in L are swapped with the data arranged in L positions among the user data bits. Selection of the u and h bits to be swapped follows one of the following methods.

(1) A bit corresponding to every second bit is selected beginning from a first header bit, h0. Among the selected h bits and u bits, bits belonging to D1 are swapped with adjacent data bits in D1, and bits belonging to D2 are swapped with adjacent data bits in D2.

(2) A bit corresponding to every third bit is selected beginning from h0. Among the selected h bits and u bits, bits belonging to D1 are swapped with adjacent data bits in D1, and bits belonging to D2 are swapped with adjacent data bits in D2.

(3) Bits are paired beginning from h0 (or h1) and every other pair is selected. The selected bit pairs are swapped with adjacent data pairs. Similarly, bits belonging to D1 are swapped with adjacent data bits in D1, and bits belonging to D2 are swapped with adjacent data bits in D2.

With reference to the accompanying drawings, a description is now provided of exemplary burst mapping for MCS-7, MCS-8 and MCS-9 according to the first preferred embodiment.

FIGS. 10A, 10B and 10C illustrate burst mapping rules for MCS-7/8/9 downlinks, to which the first preferred embodiment of the present invention is applied. The illustrated burst mapping rules are for the cases where the data arrangement pattern for D1 and D2 parts of FIG. 6 is applied.

FIG. 10A shows a mapping rule for MCS-7, FIG. 10B shows a mapping rule for MCS-8, and FIG. 10C shows a mapping rule for MCS-9. Herein, B indicates a burst index, j indicates a rearranged bit position (output bit position) in each burst, s(i) indicates an $i^{th}$ systematic bit (also denoted as 'si'), p(i) indicates an $i^{th}$ parity bit (also denoted as 'pi'), h(i) indicates an $i^{th}$ header bit (also denoted as 'hi'), u(i) indicates an $i^{th}$ USF bit (also denoted as 'ui'), and q(i) indicates a code identifier of an $i^{th}$ bit (also denoted as 'qi').

Figure 11:
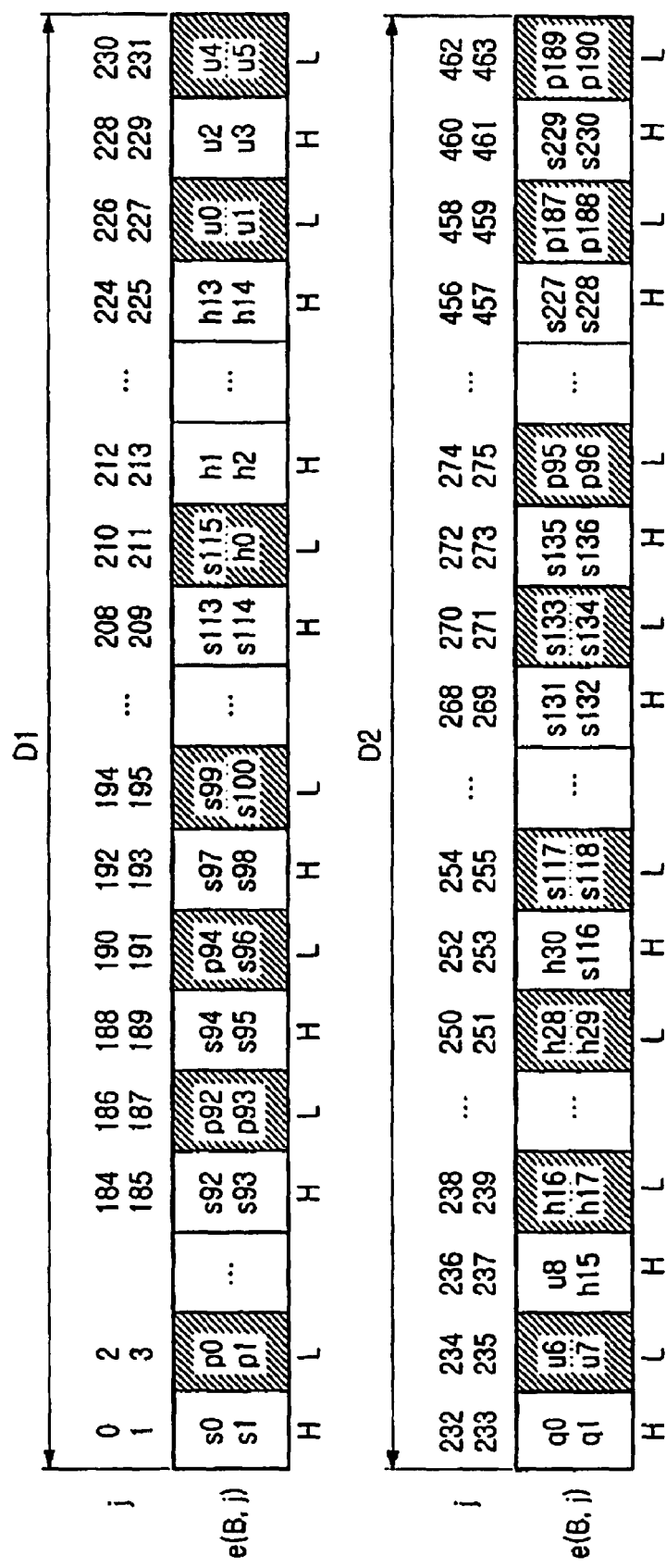
FIG. 11 illustrates a structure of data arranged in a burst using the mapping rule for MCS-7 of FIG. 10A.

FIG. 11 illustrates a structure of data arranged in a burst using the mapping rule for MCS-7 of FIG. 10A. That is, FIG. 11 illustrates a structure of data D1 and D2 arranged according to the mapping rule of FIG. 10A in a burst #0 (B=0) having the data structure shown in FIG. 6.

Referring to FIG. 11, a systematic bit s0 is allocated to a bit #0 (j=0) of D1, s1 is allocated to a bit #1 (j=1), a parity bit p0 is allocated to a bit #2 (j=2), and p1 is allocated to a bit #4 (j=3). In this manner, 211-bit d, 15-bit h and 6-bit u are allocated in the 232-bit D1 according to bit numbers (j=0 to 231). Similarly, a code identifier q0 is allocated to a bit #232 of D2, q1 is allocated to a bit #233, u6 is allocated to a bit #234, and u7 is allocated to a bit #235. In this manner, 211-bit d, 15-bit h and 6-bit u are allocated in the 232-bit D2 according to bit numbers (j=232 to 463). In FIG. 11, the non-shaded parts mean higher-reliability positions H while the shaded parts mean lower-reliability positions L.

The 'HHLL' symbol mapping rule shown in FIG. 8 is applied to every 4 bits beginning from a bit #0, or a start bit, of the burst. For example, bit positions #0 and #1 (j=0, 1) are positions of H, and bit positions #2 and #3 (j=2, 3) are positions of L, and bit positions #4 and #5 (j=4, 5) are positions of H. In this manner, higher-reliability systematic bits s are preferentially allocated to the higher-reliability positions H, and lower-reliability parity bits p are preferentially allocated to lower-reliability positions L. However, because the number of systematic bits is greater than the number of parity bits, some systematic bits may be allocated to the L positions.

FIG. 12A illustrates a swapping rule for swapping every second bit of signaling data according to the first embodiment of the present invention. By performing the bit swapping, signaling data including control information can be protected.

Referring to FIG. 12A, in D1, every second bit from a bit (j=211) where signaling data starts to a bit (j=231) where the signaling data ends is swapped with a user data bit corresponding to its bit position. In D2, every second bit from a bit (j=234) where signaling data starts to a bit (j=252) where the signaling data ends is swapped with a user data bit corresponding to its bit positions. As a result, even though some symbols including signaling data are lost, the entire signaling data can be protected.

Also, referring to FIG. 12A, in D1, every second bits of signaling data are h1(j=212), h3(j=214), h5(j=216) u2(j=228) and u4(j=230), and bits of adjacent user data corresponding to the signaling data are s94(j=188), p94(j=190), s97(j=192) s109(j=204) and s111(j=206). Therefore, the corresponding signaling data bits are swapped with the corresponding user data bits.

Similarly, in D2, adjacent user data bits corresponding to every second bits of the signaling data are swapped using the swapping rule shown in FIG. 12A.

FIG. 12B, like FIG. 12A, illustrates a swapping rule for swapping every third bit of signaling data according to the first embodiment of the present invention.

Referring to FIG. 12B, in D1, every third bit from a bit (j=211) where signaling data starts to a bit (j=231) where the signaling data ends is swapped with a user data bit corresponding to its bit positions. In D2, every third bit from a bit (j=234) where signaling data starts to a bit (j=252) where the signaling data ends are swapped with a user data bit corresponding to its bit positions. As a result, even though some symbols including signaling data are lost, the entire signaling data can be protected.

Also, referring to FIG. 12B, in D1, every third bits of signaling data are h2(j=213), h5(j=216), h8(j=219) u2(j=228) and u5(j=231), and bits of adjacent user data corresponding to the signaling data are s95(j=189), s97(j=192), s100(j=195) s106(j=201) and s109(j=204). Therefore, the corresponding signaling data bits are swapped with the corresponding user data bits.

Similarly, in D2, adjacent user data bits corresponding to every third bits of the signaling data are swapped using the swapping rule shown in FIG. 12B.

FIG. 12C, like FIGS. 12A and 12B, is a diagram illustrating a swapping rule for swapping bit pairs of signaling data according to the first embodiment of the present invention.

Referring to FIG. 12C, in D1, every other bit pair is selected beginning from a bit h1 of signaling data. That is, the selected bits are h1(j=212), h2(j=213), h5(j=216), h6(217) h13(j=224), h4(j=225), u2(j=228) and u3(j=229), and bits of adjacent user data corresponding to the signaling data are s94(j=188), s95(j=189), s97(j=192), s98(j=193), s105 (j=200), s106(j=201), s109(j=204) and s110(j=205). Therefore, the corresponding signaling data bits are swapped with the corresponding user data bits.

Similarly, in D2, adjacent user data bits corresponding to bits associated with every other pairs of the signaling data are swapped using the swapping rule shown in FIG. 12C.

The signaling data bits can be swapped with the user data bits by means of other several swapping rules other than the foregoing swapping rules.

Second Embodiment

Burst mapping performed using the SMP symbol mapping technology follows the following rule.

1. S is arranged in higher-reliability bit positions H, and P is allocated to lower-reliability bit positions L. Because the number of S bits is not equal to the number of P bits, burst mapping is formed such that as many bits as possible can follow a 'HHLL' symbol mapping rule.

2. To form burst mapping such that as many bits as possible can follow the 'HHLL' symbol mapping rule, u and h bits are treated as P bits, and allocated to L positions, for the following reason. Because the number of systematic bits is greater than the number of parity bits, some systematic bits can be arranged in the L positions. Therefore, by allocating signaling data such as u and h to the L positions, more systematic bits can be arranged in the H positions.

3. Similar to the data arrangement shown in FIG. 6 or 7, u and h bits are arranged in the L positions. However, in the arrangement, u and h bits are allocated to the positions closest to TSC in D1 and D2, if possible.

4. As shown in FIG. 6 or 7, because q bits used for code identification are non-coded data, they are allocated to the H positions closest to TSC.

5. The u and h bits selected for protection of signaling data including control information undergo bit swapping with an adjacent user data part. During the bit swapping, because the u and h bits were arranged in the L positions, they are swapped with the data arranged in the L positions among the user data bits. The bit swapping rule follows the rule described in Step 5 of the first embodiment.

With reference to the accompanying drawing, a description is now provided of exemplary burst mapping for MCS-7, MCS-8 and MCS-9 according to the second preferred embodiment.

FIGS. 13A, 13B and 13C illustrate burst mapping rules for MCS-7/8/9 downlinks to which the second embodiment of the present invention is applied. The illustrated burst mapping rules are for the cases where the data arrangement pattern for D1 and D2 parts of FIG. 6 is applied, and include even the burst mapping and bit swapping methods.

FIG. 13A shows a mapping rule for MCS-7, FIG. 13B shows a mapping rule for MCS-8, and FIG. 13C is a mapping rule for MCS-9. Herein, B indicates a burst index, j indicates a bit position (output bit position) in a burst, s indicates a systematic bit, p indicates a parity bit, h indicates a header bit, u indicates USF, and q indicates a code identifier.

Figure 14A:
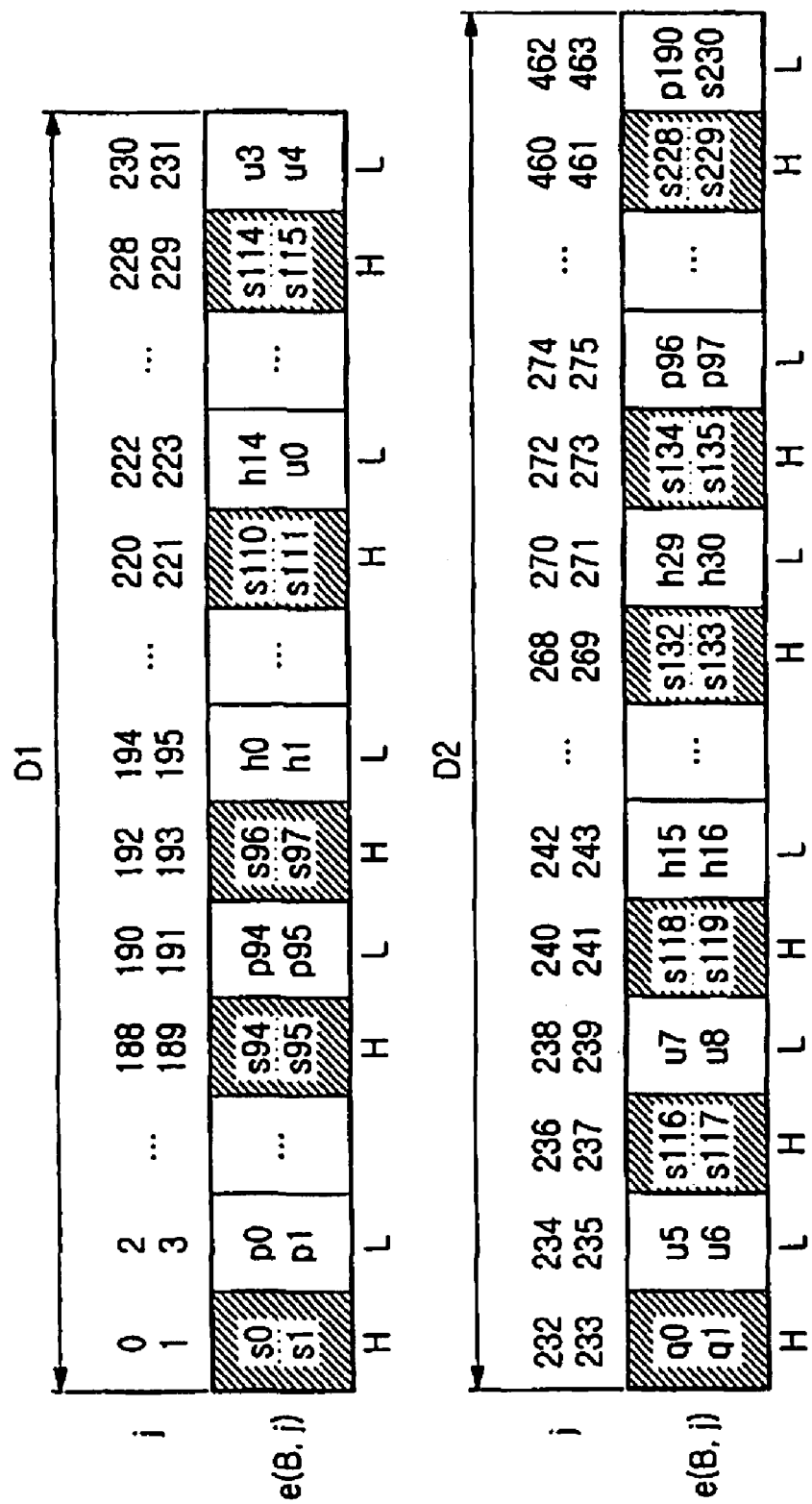
Figure 14B:
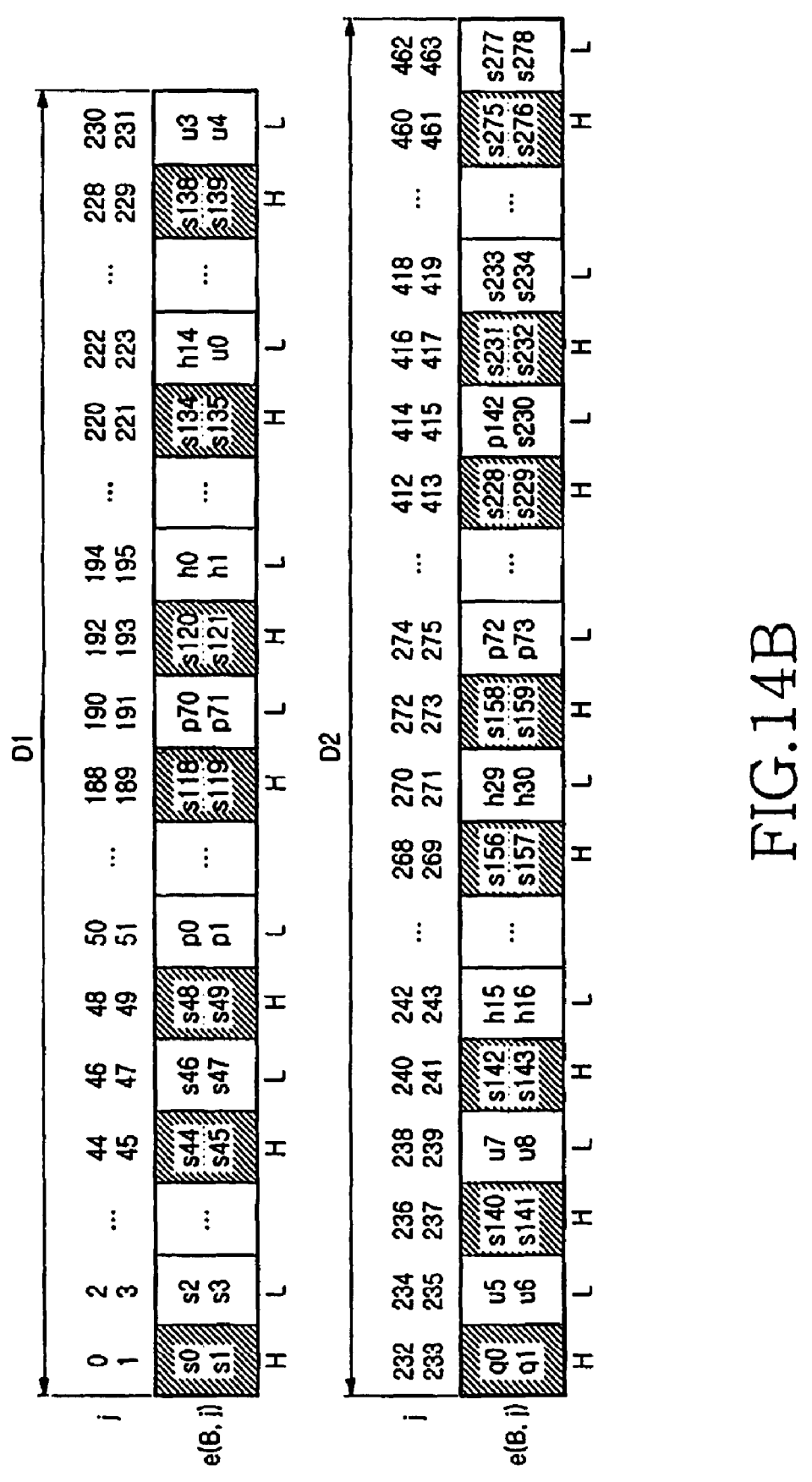
Figure 14C:
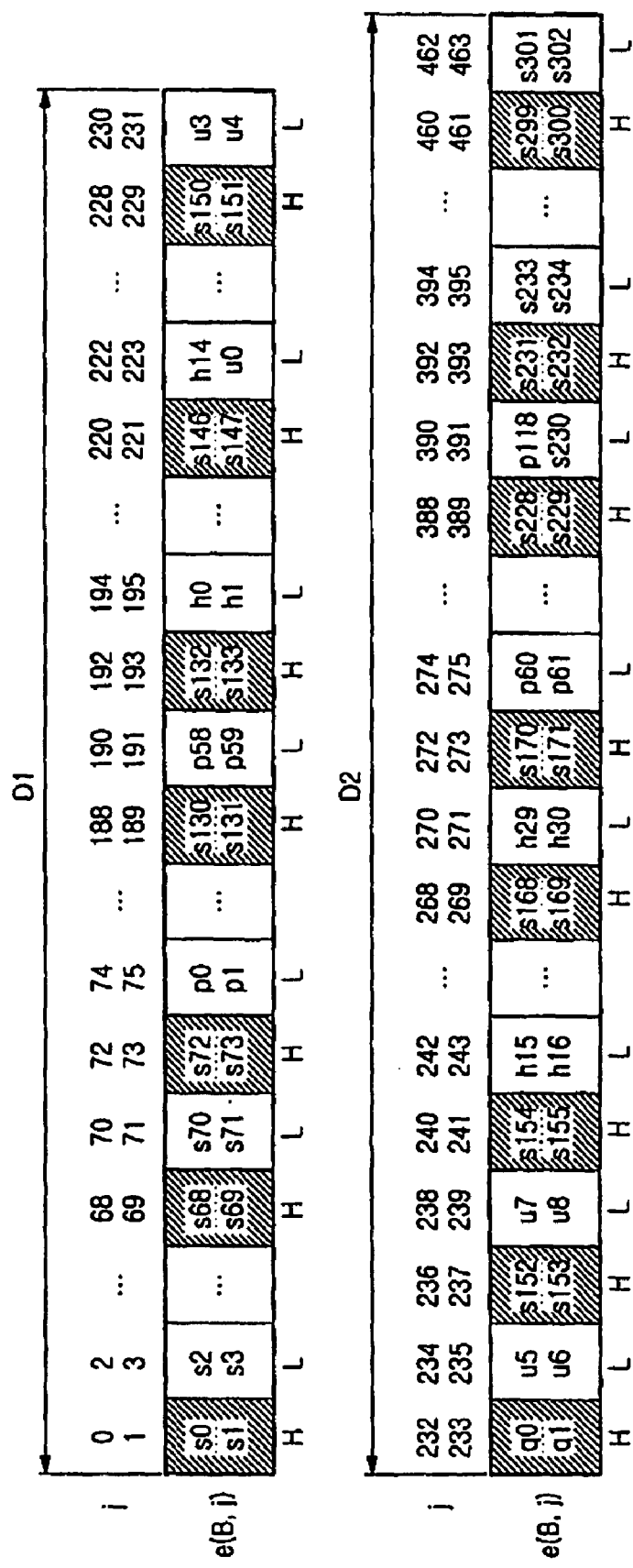

FIGS. 14A, 14B and 14C illustrate structures of data arranged in a burst #0 using the mapping rules for MCS-7/8/9 of FIGS. 13A, 13B and 13C. FIGS. 14A, 14B and 14C illustrate structures of data D1 and D2 arranged according to the mapping rules of FIGS. 13A, 13B and 13C in the burst having the data structure shown in FIG. 6.

Referring to FIG. 14A, a systematic bit s0 is allocated to a bit #0 of D1, s1 is allocated to a bit #1, a parity bit p0 is allocated to a bit #2, and p1 is allocated to a bit #3. In this manner, 211-bit d, 15-bit h and 6-bit u are allocated in the 232-bit D1 according to bit numbers (j=0 to 231). Similarly, a code identifier q0 is allocated to a bit #232 of D2, q1 is allocated to a bit #233, u6 is allocated to a bit #234, and u7 is allocated to a bit #235. In this manner, 211-bit d, 15-bit h and 6-bit u are allocated to the 232-bit D2 according to bit numbers (j=232 to 463), with the burst shown in FIG. 14A being a burst #0, B=0.

In FIG. 14A, the shaded parts mean higher-reliability positions H while the non-shaded parts mean lower-reliability positions L. The 'HHLL' symbol mapping rule shown in FIG. 8 is applied to every 4 bits beginning from a bit #0, or a start bit, of the burst. For example, bit positions #0 and #1 are positions of H, and bit positions #2 and #3 are positions of L, and bit positions #4 and #5 are positions of H. In this manner, higher-reliability systematic bits are preferentially allocated to the higher-reliability positions H, and lower-reliability parity bits are preferentially allocated to lower-reliability positions L. Shown in FIG. 14A is the bit arrangement pattern after bit swapping has been completed according to the second embodiment, and it can be noted that the signaling data is allocated to the L positions. For example, signaling data of h0, h1, h14, u0, u3, u4, u5, u6, u7 and u8 are arranged in the L positions, or the non-shaded part.

Therefore, in FIG. 14A, more systematic bits can be arranged in the H positions, compared to the first embodiment.

FIGS. 14B and 14C also show arrangement patterns of data arranged for MCS-8 and MCS-9 in the same manner as that of FIG. 14A, respectively.

Third Embodiment

Burst mapping performed using the SMP symbol mapping technology follows the following rule.

1. S is arranged in higher-reliability bit positions H, and P is allocated to lower-reliability bit positions L. Because the number of S bits is not equal to the number of P bits, burst mapping is formed such that as many bits as possible can follow a 'HHLL' symbol mapping rule.

2. To form burst mapping such that as many bits as possible can follow the 'HHLL' symbol mapping rule, u and h bits are treated as S bits, and allocated to H positions, for the following reason. Because the signaling bits including control information are important in the third embodiment, they are arranged in the higher-reliability positions H, like the systematic bits.

3. Similar to the data arrangement shown in FIG. 6 or 7, u and h bits are arranged in the H positions. In the arrangement, u and h bits are allocated to the positions closest to TSC in D1 and D2, if possible.

4. As shown in FIG. 6 or 7, because q bits used for code identification are non-coded data, they are allocated to the H positions closest to TSC.

5. The u and h bits selected for protection of signaling data including control information undergo bit swapping with an adjacent user data part. For example, during the bit swapping, because the u and h bits were arranged in the H positions, they are swapped with the data arranged in the H positions among the user data bits.

With reference to the accompanying drawings, a description is now provided of exemplary burst mapping for MCS-7, MCS-8 and MCS-9 according to the third preferred embodiment.

FIGS. 15A, 15B and 15C illustrate burst mapping rules for MCS-7/8/9 downlinks to which the third preferred embodiment of the present invention is applied. The illustrated burst mapping rules are for the cases where the data arrangement pattern for D1 and D2 parts of FIG. 6 is applied, and include the burst mapping and bit swapping methods.

FIG. 15A shows a mapping rule for MCS-7, FIG. 15B shows a mapping rule for MCS-8, and FIG. 15C shows a mapping rule for MCS-9. Herein, B indicates a burst index, j indicates a bit position (output bit position) in a burst, s indicates a systematic bit, p indicates a parity bit, h indicates a header bit, u indicates USF, and q indicates a code identifier.

Figure 16A:
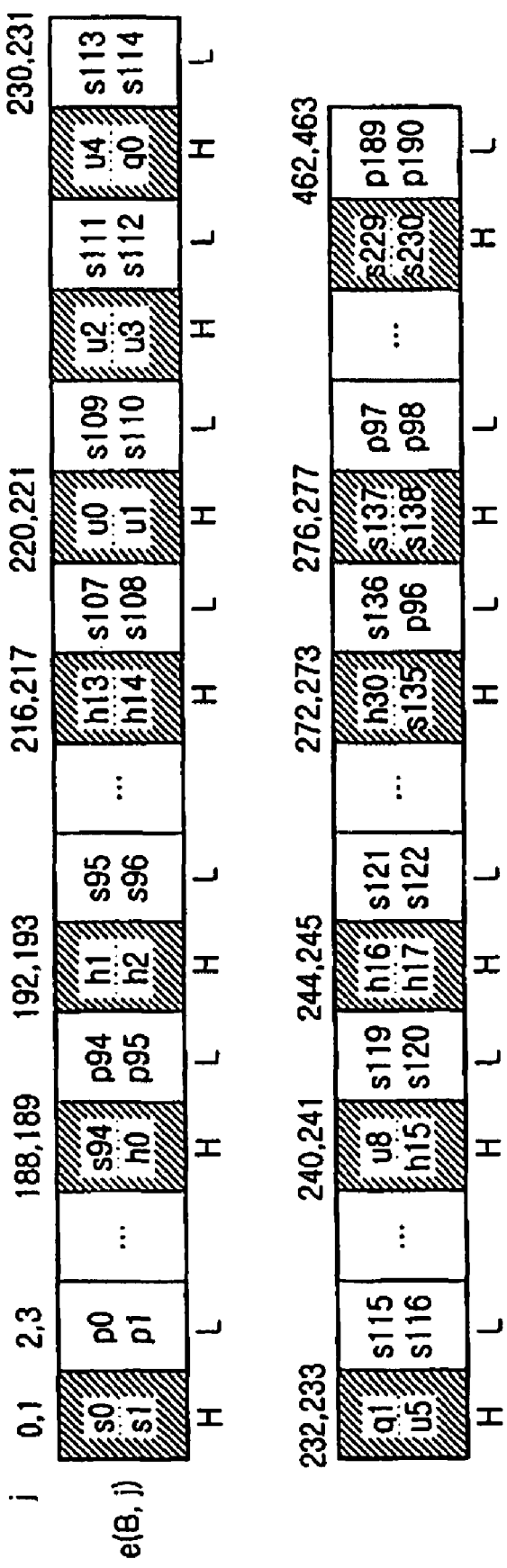
FIGS. 16A, 16B and 16C illustrate structures of data arranged in a burst #0 using the mapping rules for MCS-7/8/9 of FIGS. 15A, 15B and 15C.
Figure 16B:
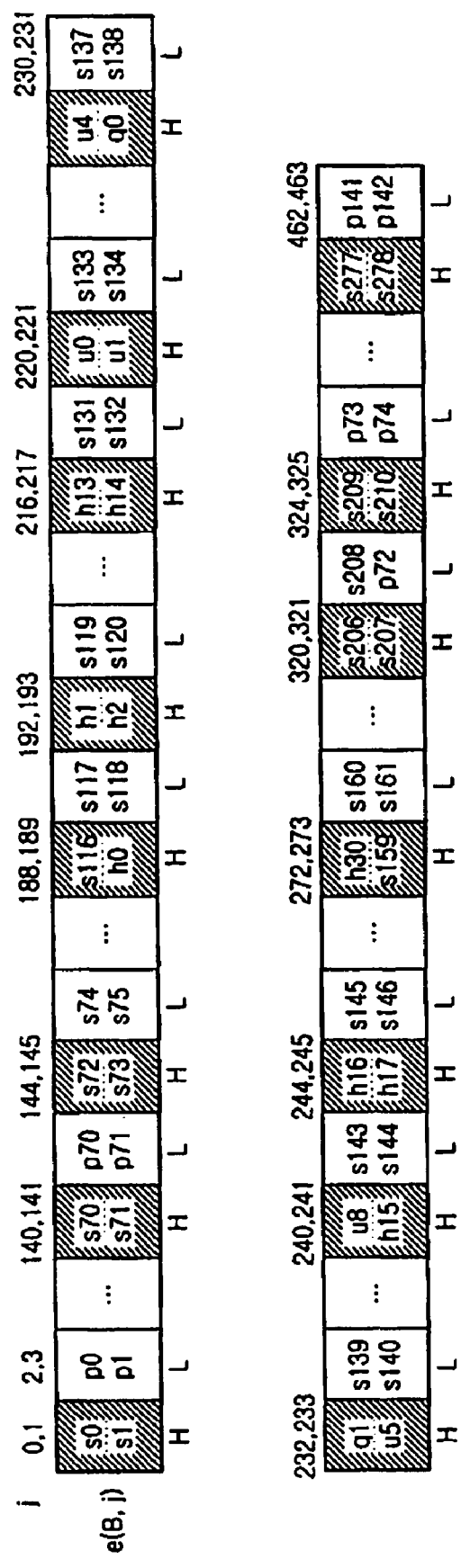
Figure 16C:
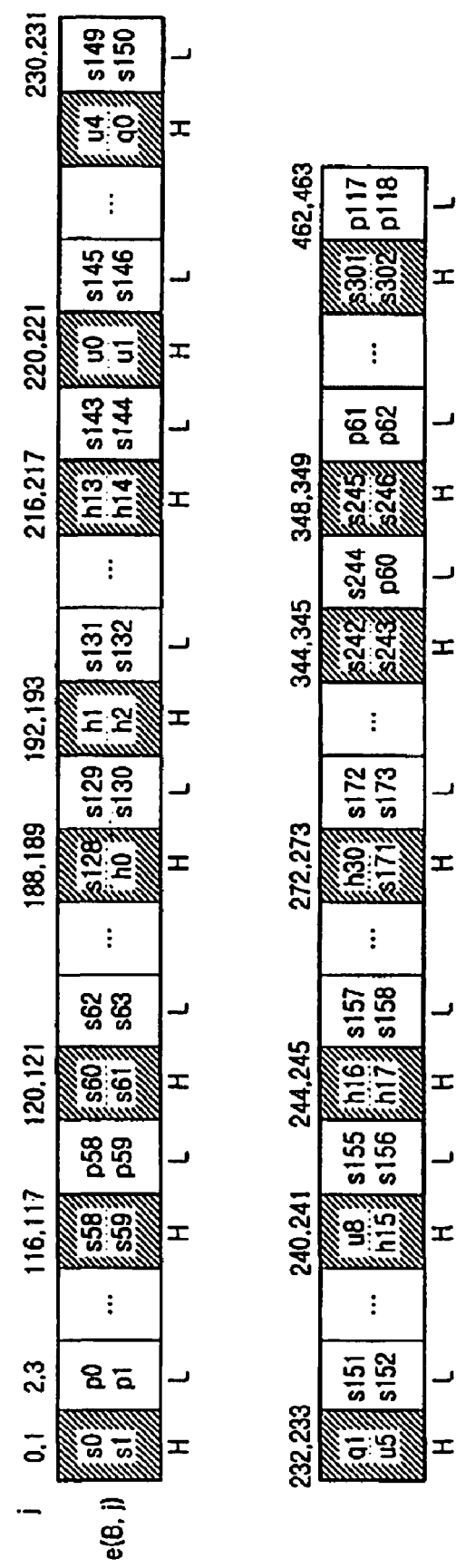

FIGS. 16A, 16B and 16C illustrate structures of data arranged in a burst #0 using the mapping rules for MCS-7/8/9 of FIGS. 15A, 15B and 15C. FIGS. 16A, 16B and 16C illustrate structures of data D1 and D2 arranged according to the mapping rules of FIGS. 15A, 15B and 15C in the burst having the data structure shown in FIG. 6.

Referring to FIG. 16A, a systematic bit s0 is allocated to a bit #0 of D1, s1 is allocated to a bit #1, a parity bit p0 is allocated to a bit #2, and p1 is allocated to a bit #3. Similarly, a code identifier q1 is allocated to a bit #232 of D2, u5 is allocated to a bit #233, s115 is allocated to a bit #234, and s116 is allocated to a bit #235. In this manner, 422-bit d, 31-bit h, 9-bit u, and 2-bit q are allocated in the 232-bit D1 and D2 according to bit number (j=0 to 463), with the burst shown in FIG. 15A being a burst #0, B=0.

In FIG. 16A, the shaded parts mean higher-reliability positions H while the non-shaded parts mean lower-reliability positions L. The 'HHLL' symbol mapping rule shown in FIG. 8 is applied to every 4 bits beginning from a bit #0, or a start bit, of the burst. For example, bit positions #0 and #1 are positions of H, and bit positions #2 and #3 are positions of L, and bit positions #4 and #5 are positions of H. In this manner, higher-reliability systematic bits and signaling data are preferentially allocated to the higher-reliability positions H, and lower-reliability parity bits are preferentially allocated to lower-reliability positions L. Shown in FIG. 16A is the bit arrangement pattern after bit swapping has been completed according to the third embodiment, and it can be noted that the signaling data is allocated to the H positions. Therefore, in FIG. 16A, the important signaling data is arranged in the higher-reliability positions H before being transmitted.

FIGS. 16B and 16C also show arrangement patterns of data arranged for MCS-8 and MCS-9 in the same manner as that of FIG. 16A, respectively.

Figure 3:
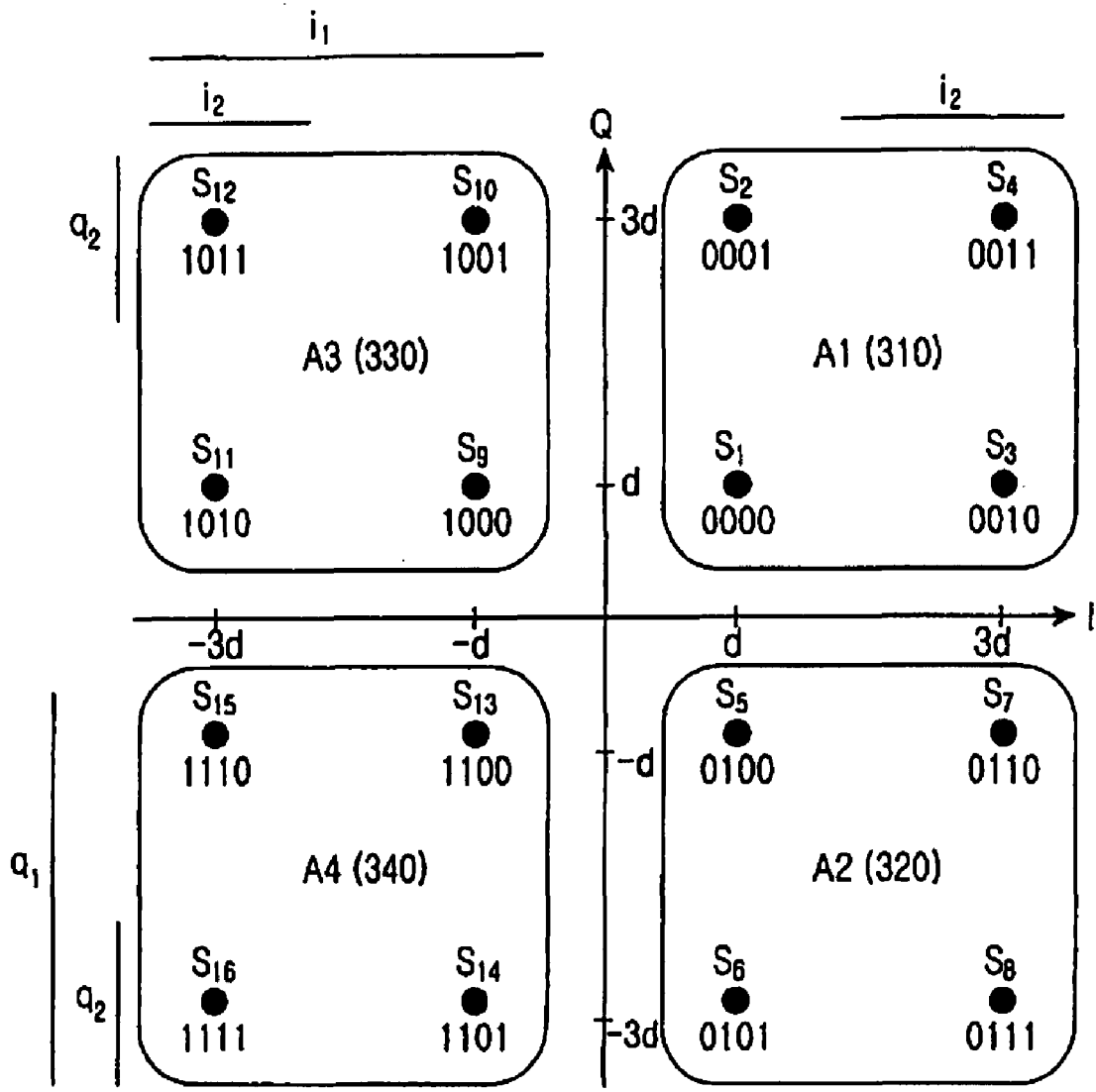
FIG. 3 illustrates a Gray-encoded signal constellation available in a 16-QAM modulation scheme of a UMTS system.

The foregoing burst mapping methods have been described with reference to signal points allocated in the rectangular 16-QAM signal constellation shown in FIG. 3. It will be recognized by those of skill in the art that the methods disclosed in the first embodiment, second embodiment and third embodiments can be applied to other Gray-encoded 16-QAM signal constellations.

Figure 17:
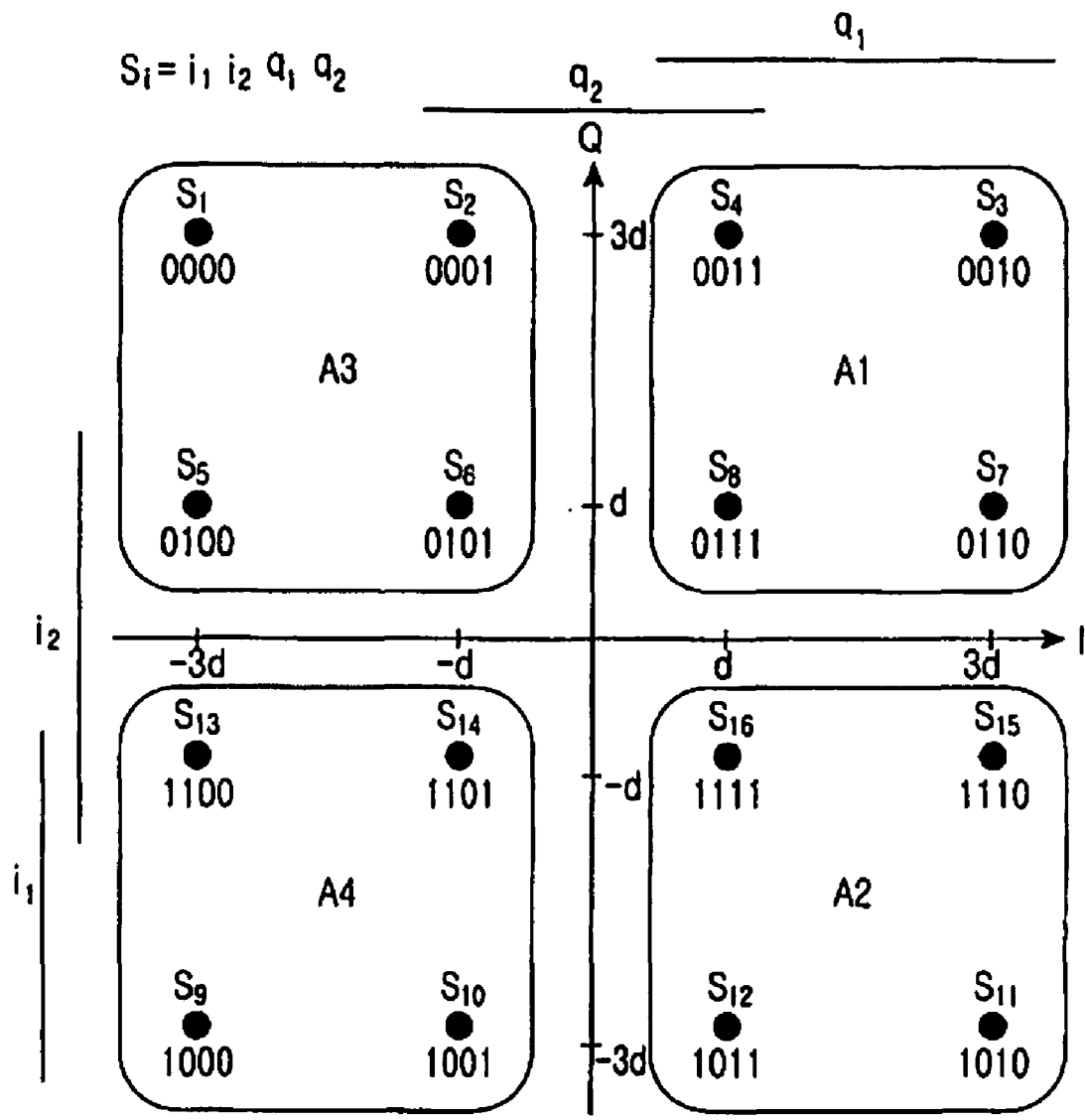
FIG. 17 illustrates a signal constellation Gray-encoded during 16-QAM modulation according to another embodiment of the present invention.

FIG. 17 illustrates a signal constellation Gray-encoded during 16-QAM modulation according to another embodiment of the present invention. When signal points are arranged as shown in FIG. 17, the SMP scheme is applied with a HLHL pattern. Therefore, for the 4 consecutive data bits ($b_n$, $b_{n+1}$, $b_{n+2}$, $b_{n+3}$) constituting one 16-QAM symbol, first and third bits ($b_n$, $b_{n+2}$) are arranged in the H positions, and the remaining two bits ($b_{n+1}$, $b_{n+3}$) are arranged in the L positions. During the shown 16-QAM modulation, ($i_1=b_n$, $i_2=b_{n+1}$) are carried on the I-axis component and ($q_1=b_{n+2}$, $q_2=b_{n+3}$) are carried on the Q-axis component. Therefore, the two bits allocated to the higher-reliability positions are allocated to $i_1$ and $q_1$, respectively. The methods of applying the SMP technology to the foregoing burst mapping, i.e. the first embodiment, second embodiment and third embodiment, can be applied after modification. In other words, the 'HHLL' pattern can be modified to the 'HLHL' pattern before its application.

The 16-QAM modulation scheme can arrange the signal constellation according to a circular 16-QAM scheme in addition to the above-mentioned rectangular 16-QAM scheme. This scheme is also called a 16-ary Amplitude Phase Keying (16-APK) modulation scheme. The circular 16-QAM can be classified into a circular (12,4) 16-QAM modulation scheme and a circular (8,8) 16-QAM modulation scheme according to arrangement of the signal constellation.

Figure 18A:
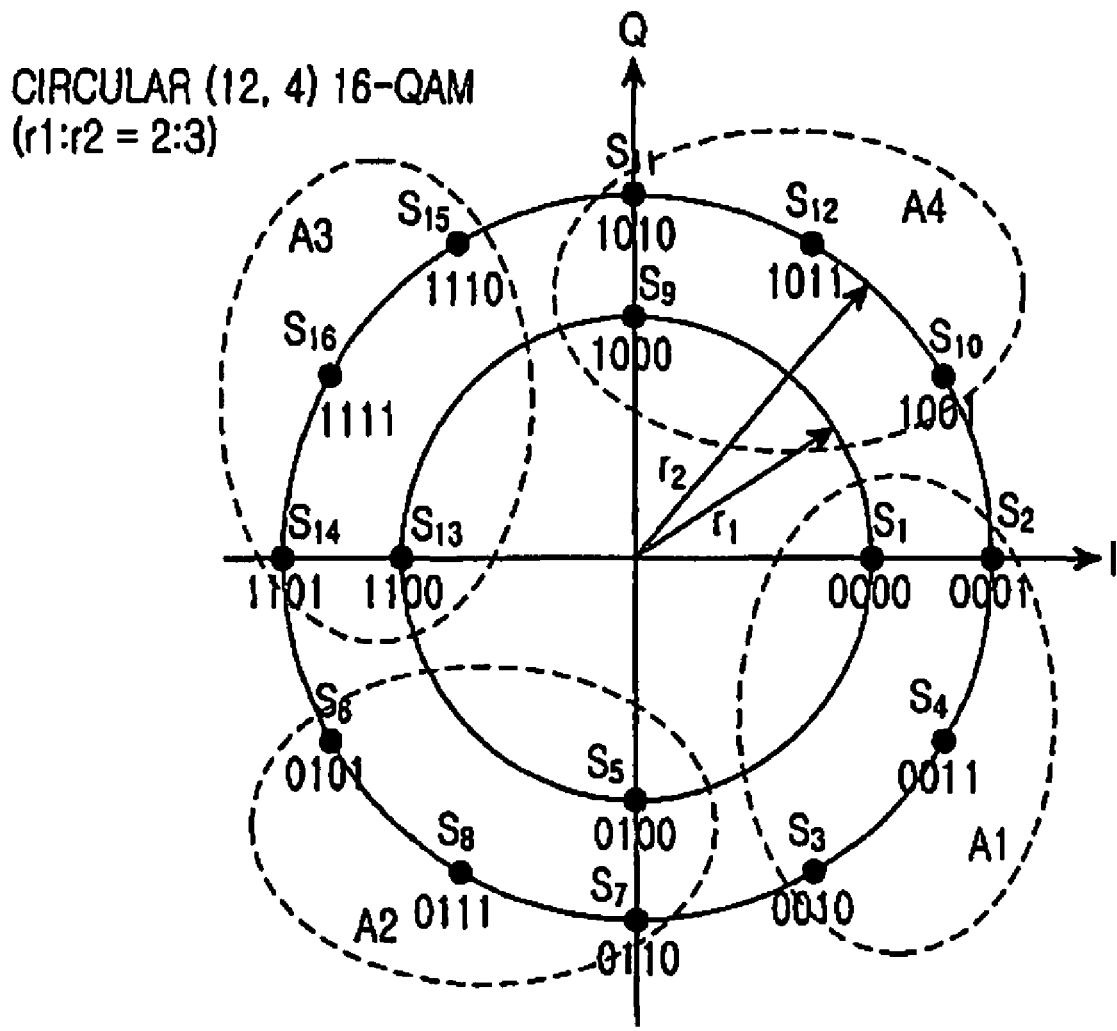
FIGS. 18A and 18B illustrate signal constellations Gray-encoded during circular 16-QAM modulation according to another embodiment of the present invention.
Figure 18B:
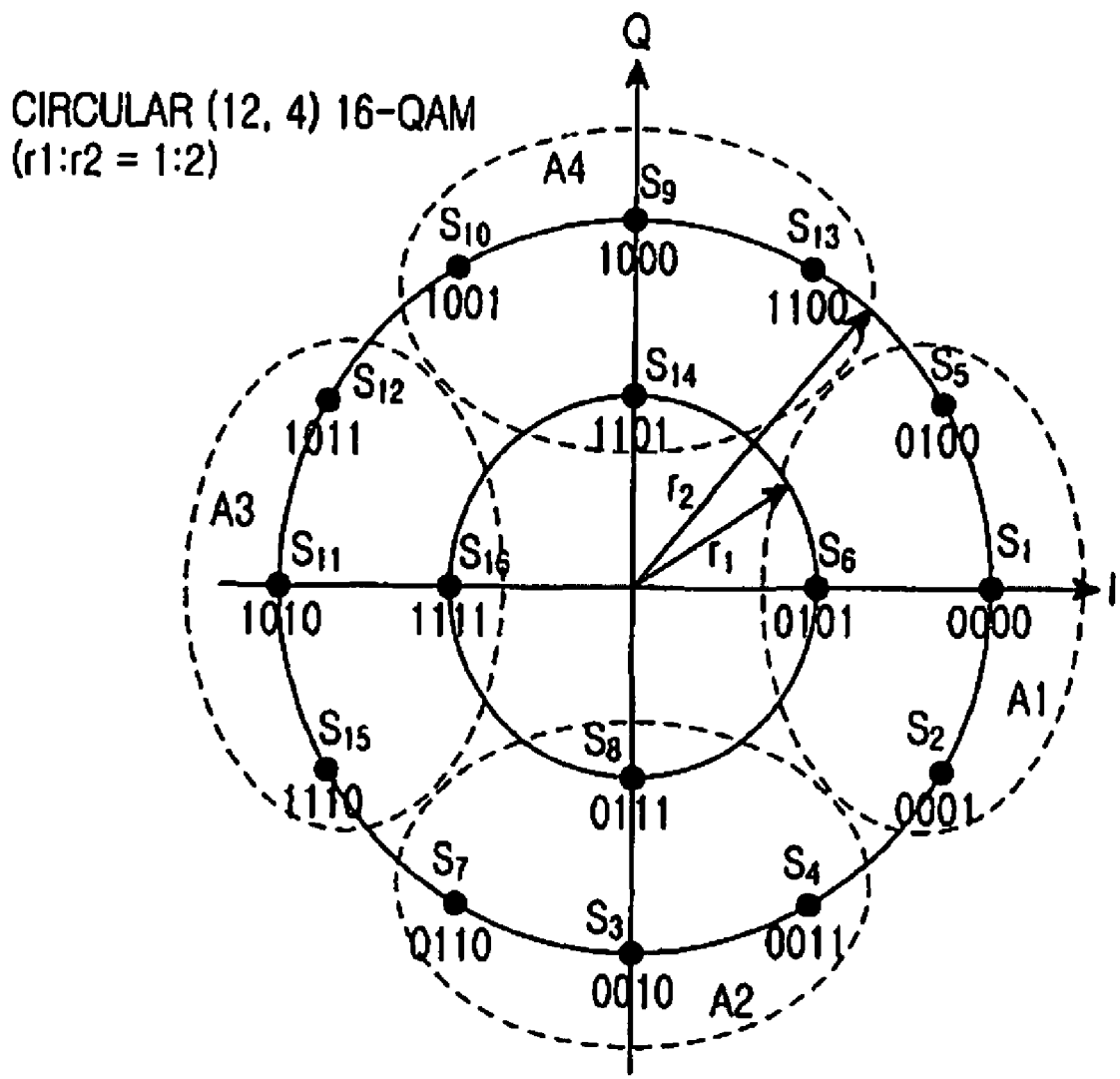

FIGS. 18A and 18B illustrate signal constellations Gray-encoded during circular 16-QAM modulation according to another embodiment of the present invention. FIGS. 18A and 18B show two exemplary constellations for the circular (12,4) 16-QAM modulation scheme.

Referring to FIG. 18A, signal points $S_1, S_2, S_3, S_4$ in areA1 correspond to 0000, 0001, 0010, 0011, respectively, wherein first bits 0 and second bits 0 are all equal. Signal points $S_5, S_6, S_7, S_8$ in area A2 correspond to 0100, 0101, 0110, 0111, respectively, wherein first bits 0 and second bits 1 are all equal. In this manner, regarding signal points in A3 and A4 areas, first bits and second bits are all equal in each area. That is, the signal points are allocated such that the first bits and the second bits should not be changed in the same area.

Therefore, the symbol mapping allocates higher-reliability bits to the unchanged first bits and second bits, and allocates lower-reliability bits to the third and fourth bits. That is, the SMP scheme is applied with the 'HHLL' pattern.

Referring to FIG. 18B, signal points $S_1, S_2, S_5, S_6$ in an area A1 correspond to 0000, 0001, 0100, 0101, respectively, wherein first bits 0 and third bits 0 are all equal. Signal points $S_3, S_4, S_7, S_8$ in an A2 area correspond to 0010, 0011, 0110, 0111, respectively, wherein first bits 0 and third bits 1 are all equal. In this manner, regarding signal points in A3 and A4 areas, first bits and third bits are all equal in each area. That is, the signal points are allocated such that the first bits and the third bits should not be changed in the same area.

Therefore, the symbol mapping allocates higher-reliability bits to the unchanged first bits and third bits, and allocates lower-reliability bits to the second and fourth bits. That is, the SMP scheme is applied with the 'HLHL' pattern.

Two types of encoding schemes can be applied to both of the case of FIG. 18A in which a radius ratio r1:r2 of constellations is 1:2, and the case of FIG. 18B in which a radius ratio r1:r2 of constellations is 2:3. That is, the Gray coding scheme of allocating bits to symbols in the constellation, can apply the scheme of allocating first and second bits such that they should not be changed in the same area, and the scheme of allocating first and third bits such that they should not be changed in the same area.

Figure 19A:
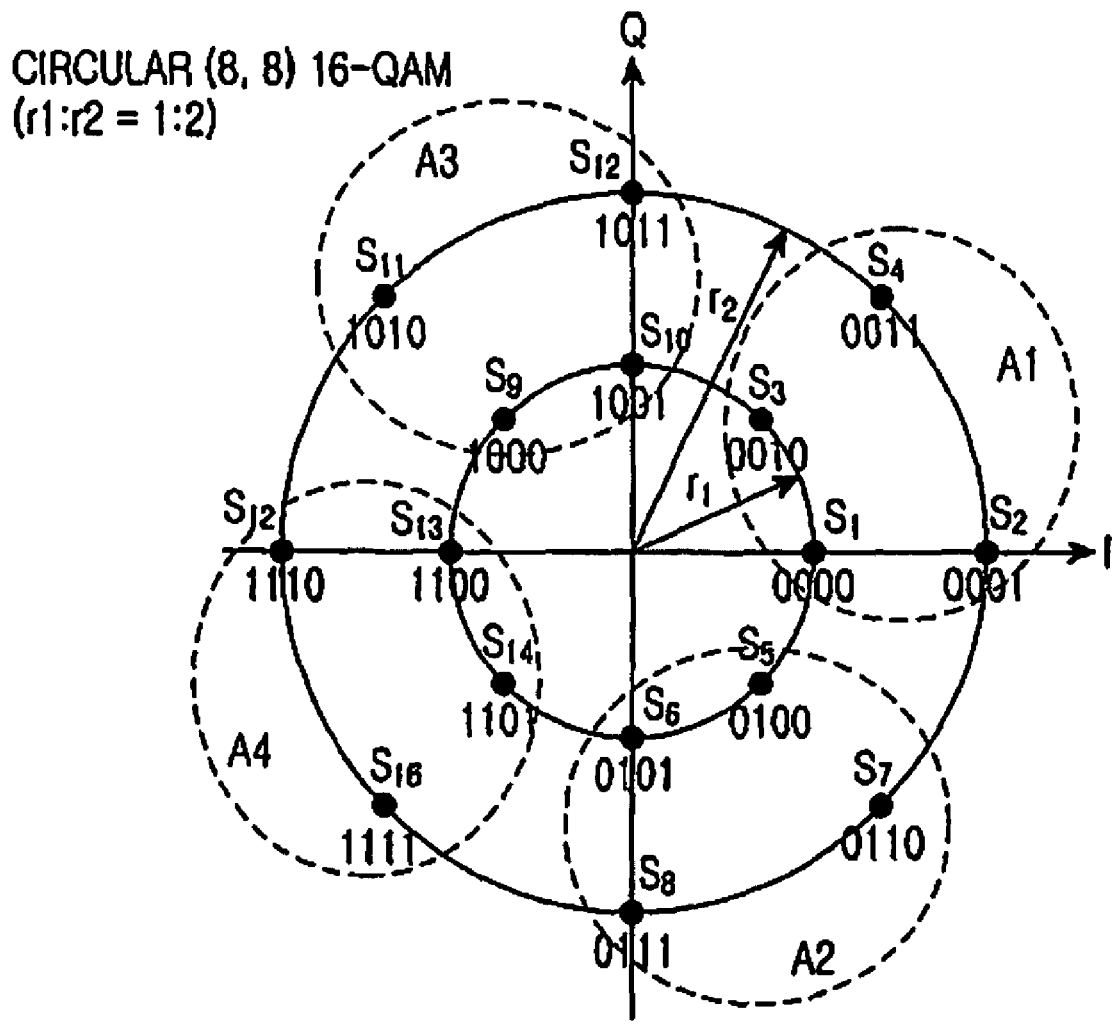
FIGS. 19A and 19B illustrate signal constellations Gray-encoded during circular 16-QAM modulation according to further another embodiment of the present invention.
Figure 19B:
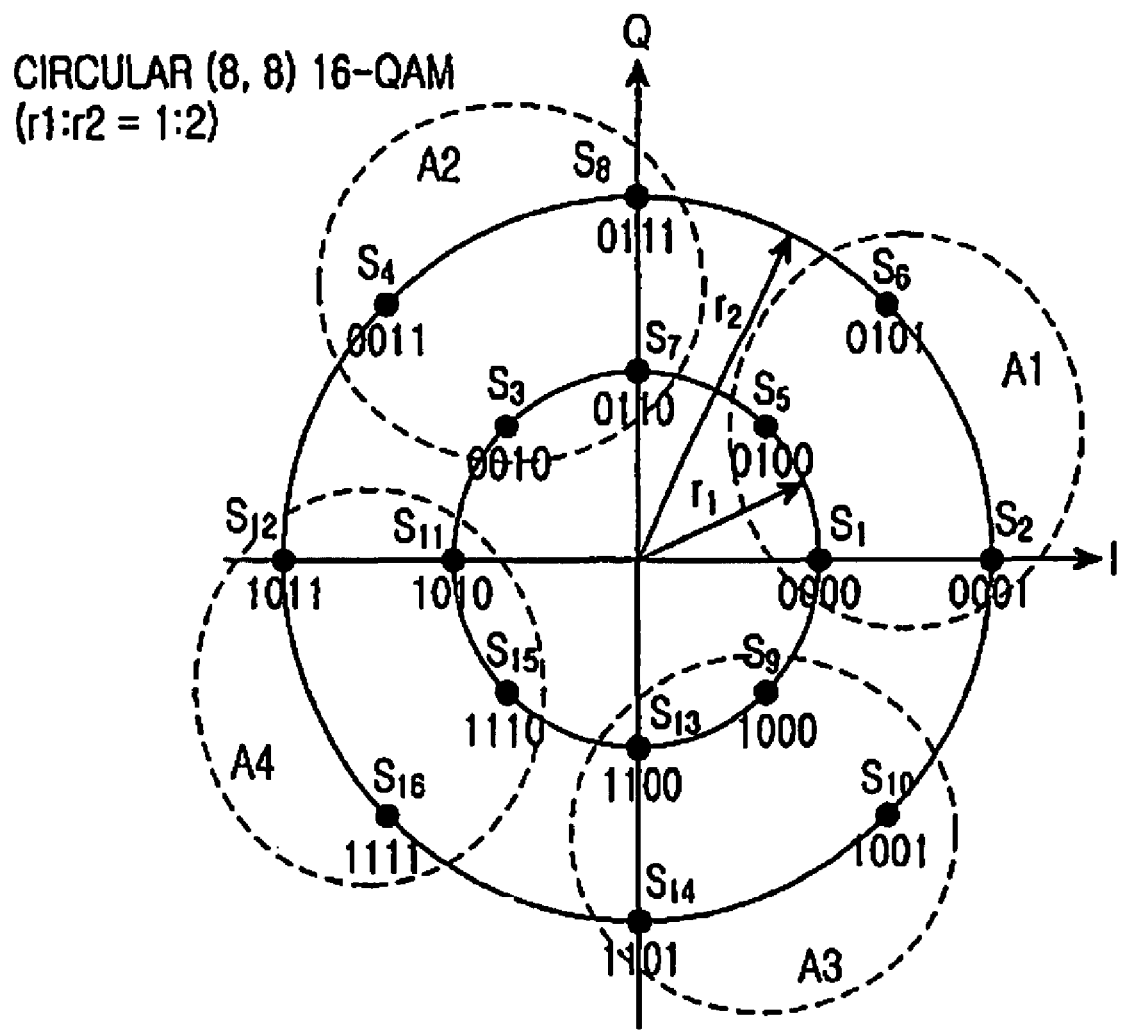

FIGS. 19A and 19B illustrate signal constellations Gray-encoded during circular 16-QAM modulation according to yet another embodiment of the present invention. FIGS. 19A and 19B illustrate two exemplary constellations for the circular (8,8) 16-QAM modulation scheme.

FIGS. 19A and 19B, as described in FIGS. 18A and 18B, show that first bits and second bits for the signal points in the same area are all equal, and first bits and third bits for the signal points in the same area are all equal. That is, FIGS. 19A and 19B show two kinds of encoding schemes for circular (8,8) 16-QAM, and the symbol mapping according to a preferred embodiment of the present invention can be applied regardless of the radius ratio, as described above.

With reference to the accompanying drawing, a description is now provide of a structure of a receiver for receiving and processing signals transmitted from a transmitter after being mapped with the methods according to embodiments of the present invention.

Figure 20:
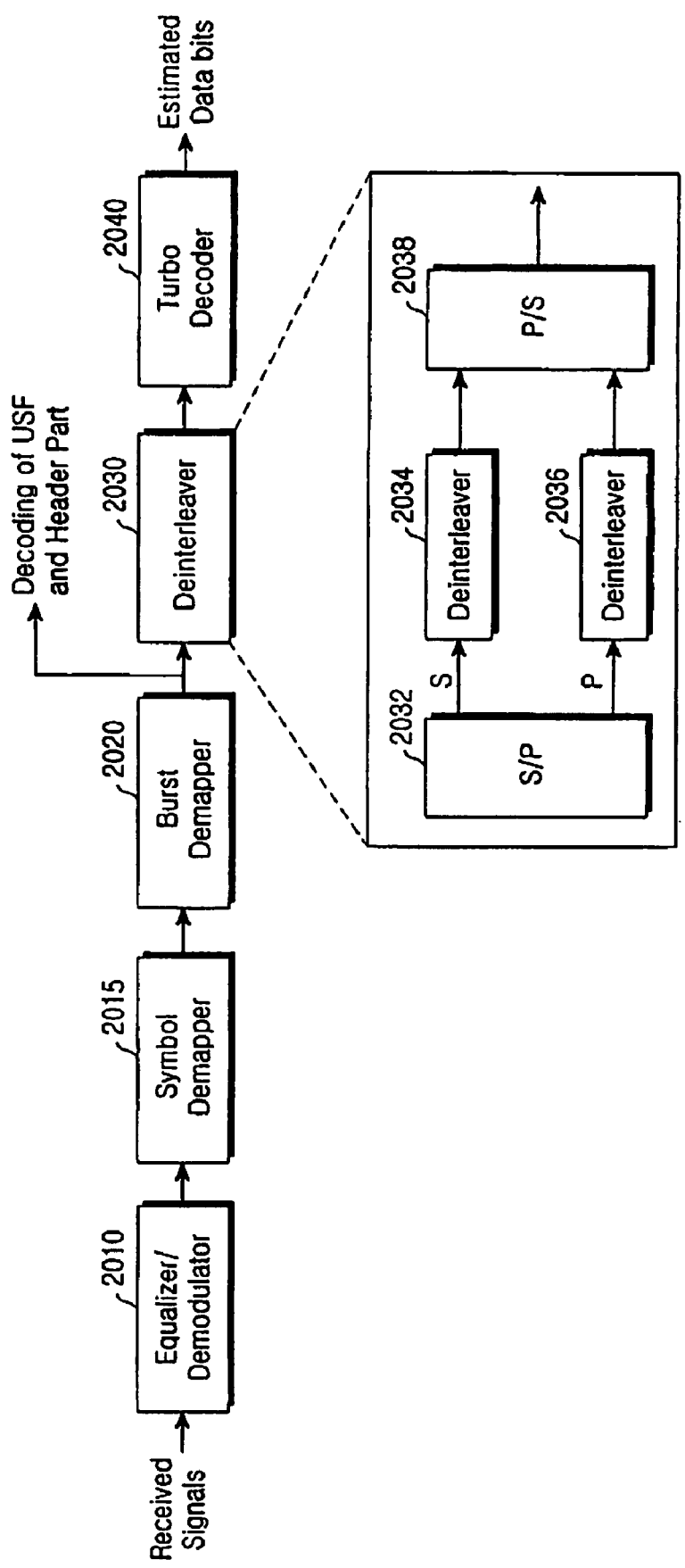
FIG. 20 illustrates a structure of a receiver for receiving a packet according to a preferred embodiment of the present invention.

FIG. 20 illustrates a structure of a receiver for receiving a packet according to a preferred embodiment of the present invention. The following description describes operation of performing the above-mentioned 16-QAM demodulation based on MCS-7/8/9.

Referring to FIG. 20, an equalizer/demodulator 2010 performs channel estimation and channel compensation on a signal received from the transmitter of FIG. 4, demodulates the channel-compensated signal according to the 16-QAM signal constellation used in the transmitter to separate the signal into 4 bursts, and outputs the bursts to a symbol demapper 2015.

The symbol demapper 2015 rearranges bits in the bursts according to one mapping rule used by the transmitter among the above-mentioned symbol mapping rules, and then delivers the rearranged bits to a burst demapper 2020. The burst demapper 2020 classifies (demaps) the rearranged bits in each burst into the bits before mapping and allocating to 4 bursts in the transmitter, i.e. signaling data such as USF and header, and user data. The signaling data means control information, and bits corresponding to the signaling data are delivered to a controller (not shown) for performing corresponding processing. Bits corresponding to the user data are delivered to a deinterleaver block 2030.

The deinterleaver block 2030 performs deinterleaving on the bits output from the burst demapper 2020. Specifically, the deinterleaver block 2030 can include a serial-to-parallel (S/P) converter 2032, deinterleavers 2034 and 2036, and a parallel-to-serial converter 2038. The serial-to-parallel converter 2032 separates the input data bits into systematic bits and parity bits, and outputs to associated deinterleavers 2034 and 2036. The deinterleavers 2034 and 2036 perform deinterleaving on input systematic bits and parity bits, respectively, and output the resulting bits to the parallel-to-serial converter 2038. The parallel-to-serial converter 2038 performs a parallel-to-serial conversion process on the deinterleaved systematic bits and parity bits, and then outputs the resulting bits to a turbo decoder 2040.

The turbo decoder 2040 performs turbo decoding on the input systematic and parity bits, thereby acquiring user data estimated from the received signal. The description has been made of an operation in which the deinterleaver block 2030 and the turbo decoder 2040 perform a decoding process on the user data. Although not described above, however, the deinterleaver block 2030 and the turbo decoder 2040 can perform a decoding process even on the control information, i.e. USF and header, thereby acquiring control information estimated from the received signal. The decoding on the control information can be performed with corresponding decoders for the control information. Herein, reference will be made to the decoded control information, for operations of the deinterleaver block 2030 and the turbo decoder 2040.

In addition, an RF unit by which the receiver receives analog signals over the air, and an A/D converter for converting the analog signal into a digital signal have been omitted herein for conciseness.

Although the foregoing burst mapping methods are for the GSM/EDGE downlink, the proposed methods can be extended and applied even to the GSM/EDGE uplink in the same way. The main difference between GSM/EDGE downlink and GSM/EDGE uplink is in that the USF bits used in the downlink are not used in the uplink system. Instead, in the uplink, the number of header bits increases by the number of USF bits used in the downlink. Therefore, with the total number of bits used for burst mapping unchanged, the burst mapping methods for the downlink can be applied.

As is apparent from the foregoing description, the present invention allows for design of efficient burst mapping for the GSM/EDGE system by applying the SMP technology to several types of 16-QAM modulation technologies, thereby improving the system performance without affecting the system complexity. In addition, the introduction of the turbo code and the 16-QAM modulation scheme contributes to an increase in spectrum efficiency, data rate, and reliability.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for performing burst mapping on transmission data by a transmitter in a mobile communication system using a 16-ary Quadrature Amplitude Modulation (16-QAM) scheme, the method comprising:
generating control information bits and user data bits by encoding input control information and user data;
dividing the control information bits and user data bits into more than two bursts;
arranging a Training Sequence Code (TSC) in a center of each burst, placing the encoded control information bits according to reliability characteristics of modulation symbols based on the 16-QAM scheme in positions adjacent to the TSC, and placing the encoded user data bits according to the reliability characteristics of the modulation symbols based on the 16-QAM scheme in a start position and an end position of each burst;
selecting control information bits to be swapped from among the control information bits;
if positions where the selected control information bits are located are higher-reliability positions, swapping the selected control information bits with user data bits in corresponding higher-reliability positions among the user data bits and adjacent positions to the selected control information bits; and
if the positions where the selected control information bits are located are lower-reliability positions, swapping the selected control information bits with user data bits in corresponding lower-reliability positions among the user data bits and adjacent positions to the selected control information bits.

2. The method of claim 1, wherein the user data is encoded using a turbo code.

3. The method of claim 1, wherein the reliability characteristics of the modulation symbols based on the 16-QAM scheme is divided according to characteristics of unchanged bits and changed bits among four bits constituting one symbol after undergoing the 16-QAM.

4. The method of claim 3, wherein the characteristics of the unchanged bits and the changed bits are HHLL, wherein H and L are higher and lower reliability positions, respectively.

5. The method of claim 3, wherein the characteristics of the unchanged bits and the changed bits are HLHL, wherein H and L are higher and lower reliability positions, respectively.

6. The method of claim 1, wherein the 16-QAM scheme is a rectangular 16-QAM scheme.

7. The method of claim 1, wherein the 16-QAM scheme is a circular 16-QAM scheme.

8. The method of claim 1, wherein for a downlink, the control information includes an uplink state flag and a header.

9. The method of claim 1, wherein for an uplink, the control information includes a header.

10. The method of claim 1, wherein a number of bits for the user data is determined according to a modulation and coding scheme applied to the user data.

11. An apparatus for performing burst mapping on transmission data in a mobile communication system using a 16-ary Quadrature Amplitude Modulation (16-QAM) scheme, the apparatus comprising:

an encoder for generating control information bits and user data bits by encoding input control information and user data;
a burst mapper for dividing the control information bits and user data bits into more than two bursts; and
a symbol mapper for arranging a Training Sequence Code (TSC) in a center of each burst, placing the encoded control information bits according to reliability characteristics of modulation symbols based on the 16-QAM scheme in positions adjacent to the TSC, placing the encoded user data bits according to the reliability characteristics of the modulation symbols based on the 16-QAM scheme in a start position and an end position of the each burst, selecting control information bits to be swapped from among the control information bits, if positions where the selected control information bits are located are higher-reliability positions, swapping the selected control information bits with user data bits in corresponding higher-reliability positions among the user data bits and adjacent positions to the selected control information bits, and if the positions where the selected control information bits are located are lower-reliability positions, swapping the selected control information bits with user data bits in corresponding lower-reliability positions among the user data bits and adjacent positions to the selected control information bits.

12. The apparatus of claim 11, wherein the encoder uses a turbo code.

13. The apparatus of claim 11, wherein the reliability characteristics of the modulation symbols based on the 16-QAM is divided according to characteristics of unchanged bits and changed bits among four bits constituting one symbol after undergoing the 16-QAM.

14. The apparatus of claim 13, wherein the characteristics of the unchanged bits and the changed bits are HHLL, wherein H and L are higher and lower reliability positions, respectively.

15. The apparatus of claim 13, wherein the characteristics of the unchanged bits and the changed bits are HLHL, wherein H and L are higher and lower reliability positions, respectively.

16. The apparatus of claim 11, wherein the 16-QAM scheme is a rectangular 16-QAM scheme.

17. The apparatus of claim 11, wherein the 16-QAM scheme is a circular 16-QAM scheme.

18. A method for receiving data in a mobile communication system using a 16-ary Quadrature Amplitude Modulation (16-QAM) modulation scheme, the method comprising:
performing channel estimation on a received signal;
swapping user data bits mapped to higher-reliability positions and adjacent positions to control information bits with control information bits mapped to higher-reliability positions among control information of more than two bursts obtained by demodulating the channel-estimated signal according to a 16-QAM signal constellation, swapping user data bits mapped to lower-reliability positions and adjacent positions to the control information bits with control information bits mapped to lower-reliability positions, thereby rearranging symbols of each burst; and
classifying the rearranged bits in each burst into bits before the bits are mapped and allocated to the bursts.

19. An apparatus for receiving data in a mobile communication system using a 16-ary Quadrature Amplitude Modulation (16-QAM) modulation scheme, the apparatus comprising:

a demodulator for performing channel estimation on a received signal;

a symbol demapper for swapping user data bits mapped to higher-reliability positions and adjacent positions to control information bits with control information bits mapped to higher-reliability positions among control information of more than two bursts obtained by demodulating the channel-estimated signal according to a 16-QAM signal constellation, swapping user data bits mapped to lower-reliability positions and adjacent positions to the control information bits with control information bits mapped to lower-reliability positions, thereby rearranging symbols of each burst; and a burst demapper for classifying the rearranged bits in each burst into bits before the bits are mapped and allocated to the bursts.

* * * * *